United States Patent
Abe et al.

(10) Patent No.: US 11,913,277 B2
(45) Date of Patent: Feb. 27, 2024

(54) METHOD FOR MANUFACTURING GLASS PANEL UNIT

(71) Applicant: PANASONIC INTELLECTUAL PROPERTY MANAGEMENT CO., LTD., Osaka (JP)

(72) Inventors: Hiroyuki Abe, Osaka (JP); Eiichi Uriu, Osaka (JP); Kazuya Hasegawa, Osaka (JP); Tasuku Ishibashi, Ishikawa (JP); Masataka Nonaka, Osaka (JP); Takeshi Shimizu, Osaka (JP); Haruhiko Ishikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 565 days.

(21) Appl. No.: 17/258,267

(22) PCT Filed: Jun. 19, 2019

(86) PCT No.: PCT/JP2019/024182
§ 371 (c)(1),
(2) Date: Jan. 6, 2021

(87) PCT Pub. No.: WO2020/026624
PCT Pub. Date: Feb. 6, 2020

(65) Prior Publication Data
US 2021/0270084 A1    Sep. 2, 2021

(30) Foreign Application Priority Data
Jul. 31, 2018  (JP) .................................. 2018-144261

(51) Int. Cl.
*E06B 3/677*    (2006.01)
*C03C 27/06*    (2006.01)
(Continued)

(52) U.S. Cl.
CPC ............ *E06B 3/6775* (2013.01); *C03C 27/06* (2013.01); *E06B 3/6612* (2013.01);
(Continued)

(58) Field of Classification Search
CPC .. E06B 3/6775; E06B 3/6612; E06B 3/66333; E06B 3/66357; E06B 3/67334;
(Continued)

(56) References Cited

U.S. PATENT DOCUMENTS 5,664,395 A * 9/1997 Collins ................. E06B 3/6612
                                                 52/786.13
6,420,002 B1   7/2002 Aggas et al.
(Continued)

FOREIGN PATENT DOCUMENTS

EP      1100107 A2    5/2001
EP    3 202 725 A1    8/2017
(Continued)

OTHER PUBLICATIONS

International Search Report and Written Opinion issued in International Patent Application No. PCT/JP2019/024182, dated Sep. 24, 2019; with partial English translation.
(Continued)

*Primary Examiner* — John L Goff, II
(74) *Attorney, Agent, or Firm* — Rimon P.C.

(57) ABSTRACT

A method for manufacturing a glass panel unit includes an assembling step, a bonding step, a gas exhausting step, a sealing step, and an activating step. The bonding step includes melting a peripheral wall in a baking furnace at a first predetermined temperature to hermetically bond a first glass pane and a second glass pane together with the peripheral wall thus melted. The gas exhausting step includes exhausting a gas from an internal space through an exhaust port in the baking furnace to turn the internal space
(Continued)

into a vacuum space. The sealing step includes locally heating to a temperature higher than a second predetermined temperature, and thereby melting, either a port sealing material or an exhaust pipe to seal the exhaust port and thereby obtain a work in progress. The activating step includes activating a gas adsorbent after the sealing step to obtain a glass panel unit.

9 Claims, 20 Drawing Sheets

(51) Int. Cl.
    *E06B 3/66* (2006.01)
    *E06B 3/663* (2006.01)
    *E06B 3/673* (2006.01)

(52) U.S. Cl.
    CPC ...... *E06B 3/66333* (2013.01); *E06B 3/66357* (2013.01); *E06B 3/67334* (2013.01); *E06B 2003/66338* (2013.01)

(58) Field of Classification Search
    CPC ........... E06B 2003/66338; C03C 27/06; C03C 27/10; B32B 17/10972
    USPC .................................................. 156/104, 109
    See application file for complete search history.

(56) References Cited

U.S. PATENT DOCUMENTS

| | | |
|---|---|---|
| 2002/0181866 A1 | 12/2002 | Crook et al. |
| 2009/0001537 A1 | 1/2009 | Summers |
| 2017/0107753 A1 | 4/2017 | Koga et al. |
| 2019/0077703 A1 | 3/2019 | Shimizu et al. |
| 2019/0084878 A1 | 3/2019 | Nonaka et al. |
| 2019/0119142 A1 | 4/2019 | Shimizu et al. |
| 2020/0181013 A1 | 6/2020 | Ishibashi et al. |
| 2021/0115729 A1 | 4/2021 | Ishibashi et al. |
| 2021/0238088 A1 | 8/2021 | Abe et al. |

FOREIGN PATENT DOCUMENTS

| | | | |
|---|---|---|---|
| EP | 3 647 291 A1 | | 5/2020 |
| JP | 2001-210225 A | | 8/2001 |
| JP | 2003-507845 A | | 2/2003 |
| JP | 2003-212610 A | | 7/2003 |
| JP | 2004-525422 A | | 8/2004 |
| KR | 10-2007-0087881 A | | 8/2007 |
| KR | 10-2014-0037451 A | * | 3/2014 |
| WO | 2001/012942 A1 | | 2/2001 |
| WO | 2016/017709 A1 | | 2/2016 |
| WO | 2016/195316 A1 | | 12/2016 |
| WO | 2017/170076 A1 | | 10/2017 |
| WO | 2019/004135 A1 | | 1/2019 |

OTHER PUBLICATIONS

Extended European Search Report dated Aug. 9, 2021 issued in corresponding European Patent Application No. 19844199.0.

* cited by examiner

METHOD FOR MANUFACTURING GLASS PANEL UNIT

CROSS-REFERENCE OF RELATED APPLICATIONS

This application is the U.S. National Phase under 35 U.S.C. § 371 of International Patent Application No. PCT/JP2019/024182, filed on Jun. 19, 2019, which in turn claims the benefit of Japanese Application No. 2018-144261, filed on Jul. 31, 2018, the entire disclosures of which Applications are incorporated by reference herein.

Technical Field

The present disclosure generally relates to a method for manufacturing a glass panel unit, and more particularly relates to a method for manufacturing a glass panel unit suitably for use in windows, for example.

BACKGROUND ART

Patent Literature 1 discloses a method for manufacturing a vacuum-insulated multi-pane glazing. According to the manufacturing method of Patent Literature 1, low-melting glass in a paste form (first low-melting glass) is interposed between respective peripheral edge portions of a pair of glass panes (hereinafter referred to as a "first glass pane" and a "second glass pane," respectively). Then, the first and second glass panes are bonded together by having the first low-melting glass melted in a baking furnace. Subsequently, a getter is introduced into a suction port of the first glass pane, and then a gas in the gap between the first and second glass panes (i.e., an internal space) is exhausted through the suction port with the internal space heated by an evacuating heater. Furthermore, low-melting glass (second low-melting glass) interposed between a cap member and the first glass pane is melted while the internal space is evacuated by exhausting the gas. This causes the cap member to be bonded onto the first glass pane, thereby closing the suction port. After the suction port has been closed, the getter is locally heated and activated to obtain a vacuum-insulated multi-pane glazing.

According to Patent Literature 1, however, the suction port is closed with the internal space heated, thus often causing a gas derived from at least a component in the first low-melting glass to be emitted into the internal space during the heating. That is to say, this often causes the gas to be emitted from at least the first low-melting glass into the evacuated internal space (i.e., a vacuum space) even just after the suction port has been closed. This increases the chances of a residual gas being left in the vacuum space even if the getter is activated.

CITATION LIST

Patent Literature

Patent Literature 1: JP 2003-212610 A

SUMMARY OF INVENTION

It is therefore an object of the present disclosure to provide a method for manufacturing a glass panel unit contributing to reducing the chances of residual gases being left in the vacuum space.

A method for manufacturing a glass panel unit according to an aspect of the present disclosure includes an assembling step, a bonding step, a gas exhausting step, a sealing step, and an activating step. The assembling step includes providing an assembly. The assembly includes a first glass pane, a second glass pane, a peripheral wall, an internal space, a gas adsorbent, and an exhaust port. The second glass pane is arranged to face the first glass pane. The peripheral wall is provided between the first glass pane and the second glass pane. The peripheral wall has a frame shape. The internal space is surrounded with the first glass pane, the second glass pane, and the peripheral wall. The gas adsorbent is disposed in the internal space. The exhaust port allows the internal space to communicate with an external environment. The bonding step includes melting the peripheral wall in a baking furnace at a first predetermined temperature to hermetically bond the first glass pane and the second glass pane together with the peripheral wall thus melted. The gas exhausting step includes exhausting a gas from the internal space through the exhaust port in the baking furnace to turn the internal space into a vacuum space. The sealing step includes maintaining a temperature in the baking furnace at a second predetermined temperature equal to or lower than the first predetermined temperature. The sealing step further includes locally heating to a temperature higher than the second predetermined temperature, and thereby melting, either a port sealing material inserted into the exhaust port or an exhaust pipe connected to the exhaust port to seal the exhaust port and thereby obtain a work in progress. The activating step includes activating the gas adsorbent after the sealing step to obtain a glass panel unit.

The present disclosure reduces the chances of a residual gas being left in the vacuum space.

DESCRIPTION OF EMBODIMENTS

An exemplary embodiment of the present disclosure will now be described.

1. Embodiment 1.1. Overview

Figure 1:
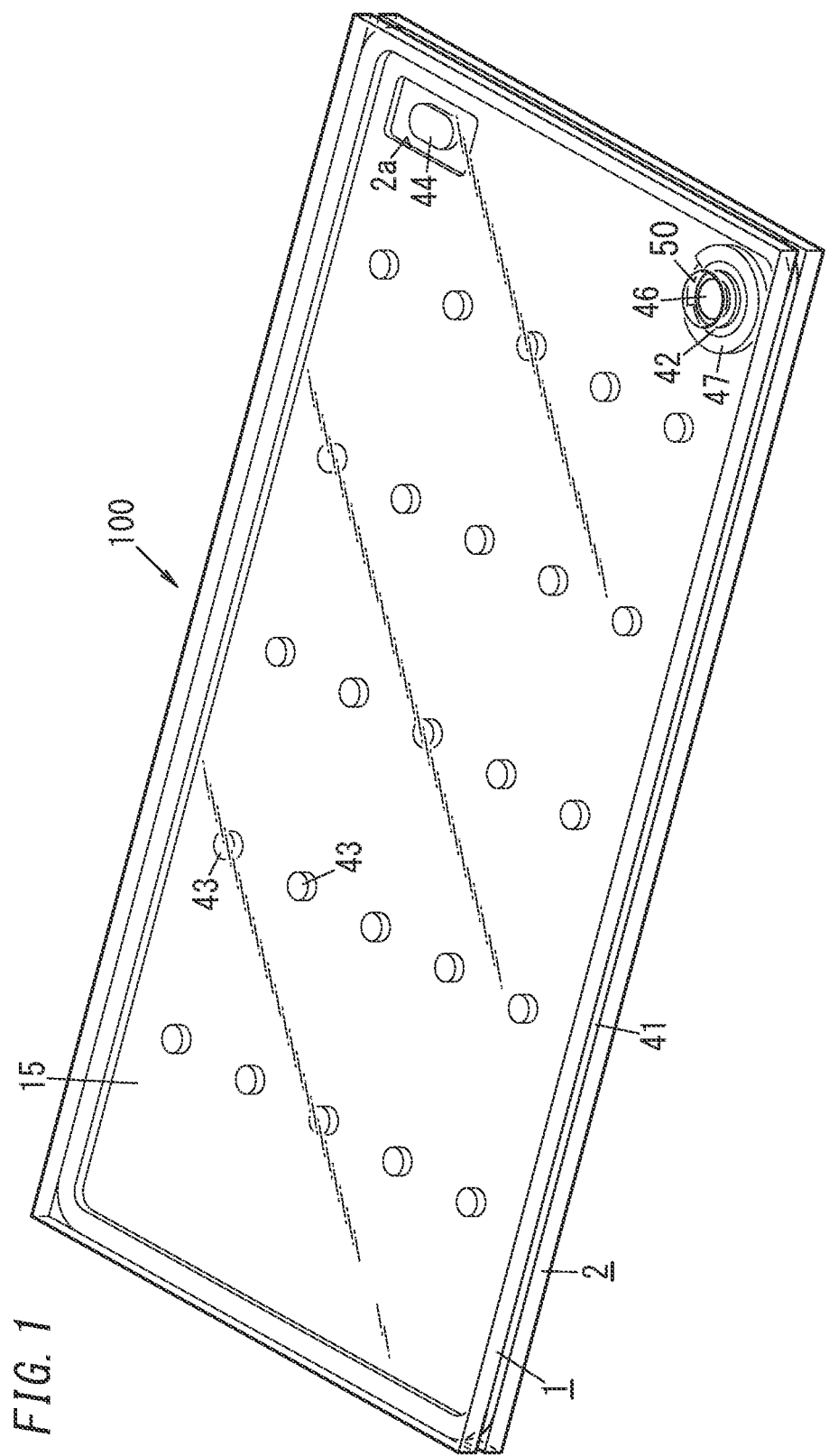
FIG. 1 is a perspective view of a glass panel unit according to an exemplary embodiment.
Figure 2:
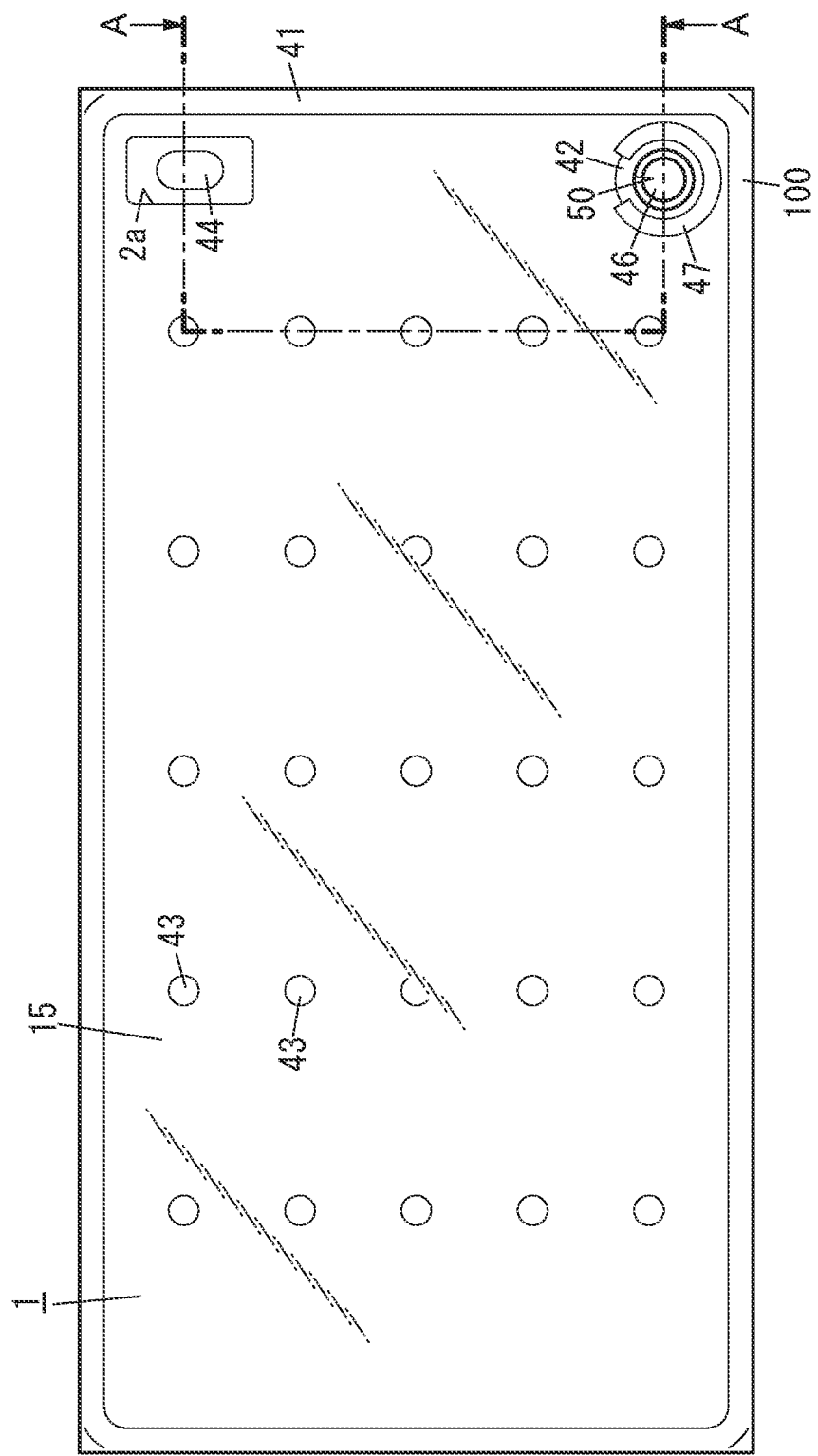
FIG. 2 is a front view of the glass panel unit.
Figure 3:
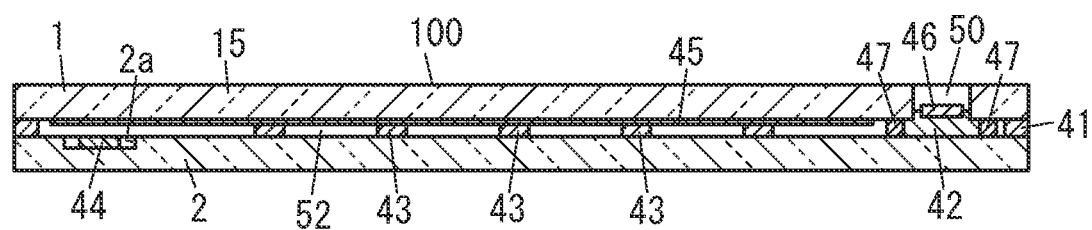
FIG. 3 is a cross-sectional view thereof taken along the plane A-A shown in FIG. 2.

FIGS. 1-3 illustrate a glass panel unit (glass panel unit as a final product) 100 according to an exemplary embodiment. The glass panel unit 100 includes a first glass pane 1, a second glass pane 2, a frame member 41, a vacuum space 52, a port sealing material 42, an exhaust port 50, a dam member 47, a plurality of spacers (pillars) 43, and a gas adsorbent 44. The second glass pane 2 is arranged to face the first glass pane 1. The frame member 41 is provided between the first glass pane 1 and the second glass pane 2. The frame member 41 hermetically bonds the first glass pane 1 and the second glass pane 2 together. The vacuum space 52 is surrounded with the first glass pane 1, the second glass pane 2, and the frame member 41. The gas adsorbent 44 and the dam member 47 are located in the vacuum space 52. The port sealing material 42 is dammed up by the dam member 47 to seal the exhaust port 50.

In this glass panel unit 100, the gas adsorbent 44 is provided in the vacuum space 52, thus curbing a decline in thermal insulation properties of the glass panel unit 100.

1.2 Configuration

Next, the glass panel unit 100 will be described in further detail. The glass panel unit 100 according to this embodiment is a so-called "vacuum-insulated glazing (or glass) (VIG) unit." The VIG unit is a type of multi-pane glazing unit including at least one pair of glass panels and having a vacuum space between the pair of glass panels.

As shown in FIGS. 1-3, the glass panel unit 100 includes the pair of glass panes (first and second glass panes) 1, 2, the frame member 41, the port sealing material 42, and the gas adsorbent 44. The glass panel unit 100 further includes a space (vacuum space) 52 surrounded with the first and second glass panes 1, 2 and the frame member 41. The glass panel unit 100 further includes, in the vacuum space 52, the plurality of pillars (spacers) 43 and the dam member 47.

The first and second glass panes 1, 2 each have a rectangular flat plate shape. The first and second glass panes 1, 2 have the same planar shape.

The first glass pane 1 includes a body 15, an infrared reflective film 45, and the exhaust port 50. The infrared reflective film 45 is provided in the vacuum space 52 to cover the body 15. The exhaust port 50 is sealed with the port sealing material 42. The infrared reflective film 45 is in contact with the body 15. The infrared reflective film 45 does have a light-transmitting property but hardly transmits an incoming infrared ray. This allows the infrared reflective film 45 to improve the thermal insulation properties of the glass panel unit 100. The infrared reflective film 45 may be a thin metallic film, for example. The infrared reflective film 45 may contain silver, for example. The infrared reflective film 45 may be a low-E film, for example. The body 15 defines a major shape of the first glass pane 1, and therefore, has a rectangular flat plate shape. Examples of materials for the body 15 include soda lime glass, high strain point glass, chemically tempered glass, alkali-free glass, quartz glass, Neoceram, and thermally tempered glass. The body 15 has the same shape as the second glass pane 2.

The second glass pane 2 has a bottomed recess 2a. The recess 2a is formed to be located in the vacuum space 52. Also, the recess 2a is provided to be depressed away from the first glass pane 1 with respect to the vacuum space 52. Examples of materials for the second glass pane 2 include soda lime glass, high strain point glass, chemically tempered glass, alkali-free glass, quartz glass, Neoceram, and thermally tempered glass.

The frame member 41 is provided between the first glass pane 1 and the second glass pane 2 to hermetically bond the first glass pane 1 and the second glass pane 2 together. This creates a space surrounded with the first glass pane 1, the second glass pane 2, and the frame member 41. The space surrounded with the first glass pane 1, the second glass pane 2, and the frame member 41 is the vacuum space 52. The frame member 41 is made of a hot glue (sealant). In other words, the frame member 41 is a cured hot glue. The hot glue includes a glass frit and a binder component. The bonder component may be a resin, for example. This would facilitate applying the sealant in a sealant arrangement step to be described later. The binder component is suitably a resin with a low molecular weight and a component to be easily decomposed by heating. In this embodiment, the hinder component is not limited to any particular material. Examples of the binder component include ethyl cellulose, acrylic resin, and butyral resin. Examples of the glass frit include low-melting glass fit, which may be a V—Te—Ag based glass frit, for example. The frame member 41, as well as the first and second glass panes 2, has a polygonal (e.g., quadrangular in this embodiment) frame shape. The frame member 41 is formed along the outer periphery of the first and second glass panes 1, 2. The component included in the hot glue does not have to be a glass fit with a binder component but may also be a low-melting metal or a hot-melt adhesive, for example.

The dam member 47 may be formed in the shape of an incomplete ring (e.g., a C-ring) as shown in FIG. 2. The dam member 47 is arranged along the peripheral edge of the exhaust port 50 in a plan view. This allows the dam member 47 to dam the port sealing material 42 up within a space inside the dam member 47. Thus, the port sealing material 42 may seal the exhaust port 50 up. The dam member 47 is made of the same material as the frame member 41.

The gas adsorbent 44 is arranged in the recess 2a as shown in FIG. 3. The gas adsorbent 44 is in contact with the bottom of the recess 2a. The gas adsorbent 44 is used to adsorb an unnecessary gas (such as a residual gas) in the vacuum space 52. Examples of the unnecessary gas include a gas emitted from the hot glue as a constituent material of the frame member 41 when the hot glue is heated. The unnecessary gas may be hydrocarbon, for example.

In addition, the gas adsorbent 44 also contains a metallic getter material. Therefore, when activated, the gas adsorbent 44 may adsorb the gas in the vacuum space 52, thus reducing deterioration in the quality of the vacuum space 52. This curbs a decline in the thermal insulation properties of the glass panel unit 100.

The metallic getter material is a non-evaporative getter material. Specifically, the metallic getter material has a metal surface with the ability to chemically adsorb gas molecules. Nevertheless, depending on the composition of the metallic getter material, even when activated in a vacuum space, the metallic getter material does not adsorb the residual gas in the vacuum space easily enough to lower the degree of vacuum in the vacuum space to a predetermined value or less. This is because when heated in the air, the metallic getter material will adsorb the gas in the air too much to avoid losing its activity. Examples of unsuitable metallic getter material compositions according to this embodiment include Zr 60%-V—Fe—Mn—Re and Zr 70%-V 24.6%-Fe 5.4%. Also, in other unsuitable metallic getter materials, when activated in a vacuum space, the metallic getter material is required to be activated at a temperature equal to or higher than the softening point (of 730° C., for example) of a glass pane or activated by being heated for a long time at a temperature equal to or lower than the softening point of the glass pane. Particularly when the metallic getter material is activated at a temperature equal to or higher than the softening point of a glass pane, the glass pane will crack easily, likewise, even when the metallic getter material is locally heated for 1 minute or more, the glass pane will also crack easily. Examples of unsuitable metallic getter material compositions according to this embodiment include Zr 60%-Ti 40%. Thus, a suitable metallic getter material according to this embodiment contains titanium, vanadium, and iron, Such a metallic getter material has the property of hardly losing its activity even when heated in the air, Specifically, even if gas molecules are adsorbed onto the metal surface of the metallic getter material, the metallic getter material may cause those gas molecules to diffuse inside the metallic getter material when activated, Thus, the metallic getter material may (chemically) adsorb gas molecules onto the metal surface thereof before being activated. In addition, the gas adsorbent 44 contains the metallic getter material, thus allowing the metallic getter material to adsorb gases present in the vacuum space 52. Examples of the gases present in the vacuum space 52 include water vapor, nitrogen, oxygen, hydrogen, carbon oxides such as carbon dioxide and carbon monoxide, and hydrocarbon. Among other things, hydrocarbon is not adsorbed easily even by a metallic getter material containing titanium, vanadium, and iron. Thus, this embodiment reduces the chances of gases such as hydrocarbon being left in the vacuum space 52 by performing the manufacturing method to be described later.

In a first example of this embodiment, the metallic getter material contains 80-90 atm % of titanium, 0-5 atm % of aluminum, 0-10 atm % of silicon, 10-15 atm % of vanadium, and 5-15 atm % of iron.

In a second example of this embodiment, the metallic getter material contains at least one non-evaporative getter alloy powder having excellent ability to adsorb gases such as hydrogen, carbon oxide, and nitrogen, in particular. The alloy powder contains, as its constituent elements, titanium, silicon, and at least one additional metallic element selected from the group consisting of vanadium, iron, and aluminum. The composition ratios of the respective metallic elements may be varied within the following ranges:
 a) titanium: 60-85 atm %;
 b) silicon: 1-20 atm %; and
 c) vanadium, iron, and aluminum: 10-30 atm % in total.

The gas adsorbent 44 containing the metallic getter material may be, for example, TAAL manufactured by SAES Getters S.p.A.

The plurality of pillars 43 are placed in the vacuum space 52. The plurality of pillars 43 are used to maintain a predetermined gap between the first and second glass panes 1, 2. That is to say, the plurality of pillars 43 are used to maintain the gap distance between the first and second glass panes 1, 2 at a desired value. Note that the dimensions, number, pitch, and arrangement pattern of the pillars 43 may be selected appropriately. The respective pillars 43 may have the shape of circular columns, of which the height is approximately equal to the gap distance between the first and second glass panes 1, 2. For example, the pillars 43 may have a diameter of 1 mm and a height of 100 μm. Optionally, the pillars 43 may also have a prismatic, spherical, or any other desired shape.

The vacuum space 52 is a space having a degree of vacuum equal to or less than a predetermined value. The predetermined value may be 0.1 Pa, for example. The vacuum space 52 is hermetically sealed by the first glass pane 1, the second glass pane 2, and the frame member 41.

1.3. Manufacturing Method

Next, a method for manufacturing the glass panel unit 100 will be described with reference to FIGS. 4-17. The method for manufacturing the glass panel unit 100 includes preparatory steps.

Figure 4:
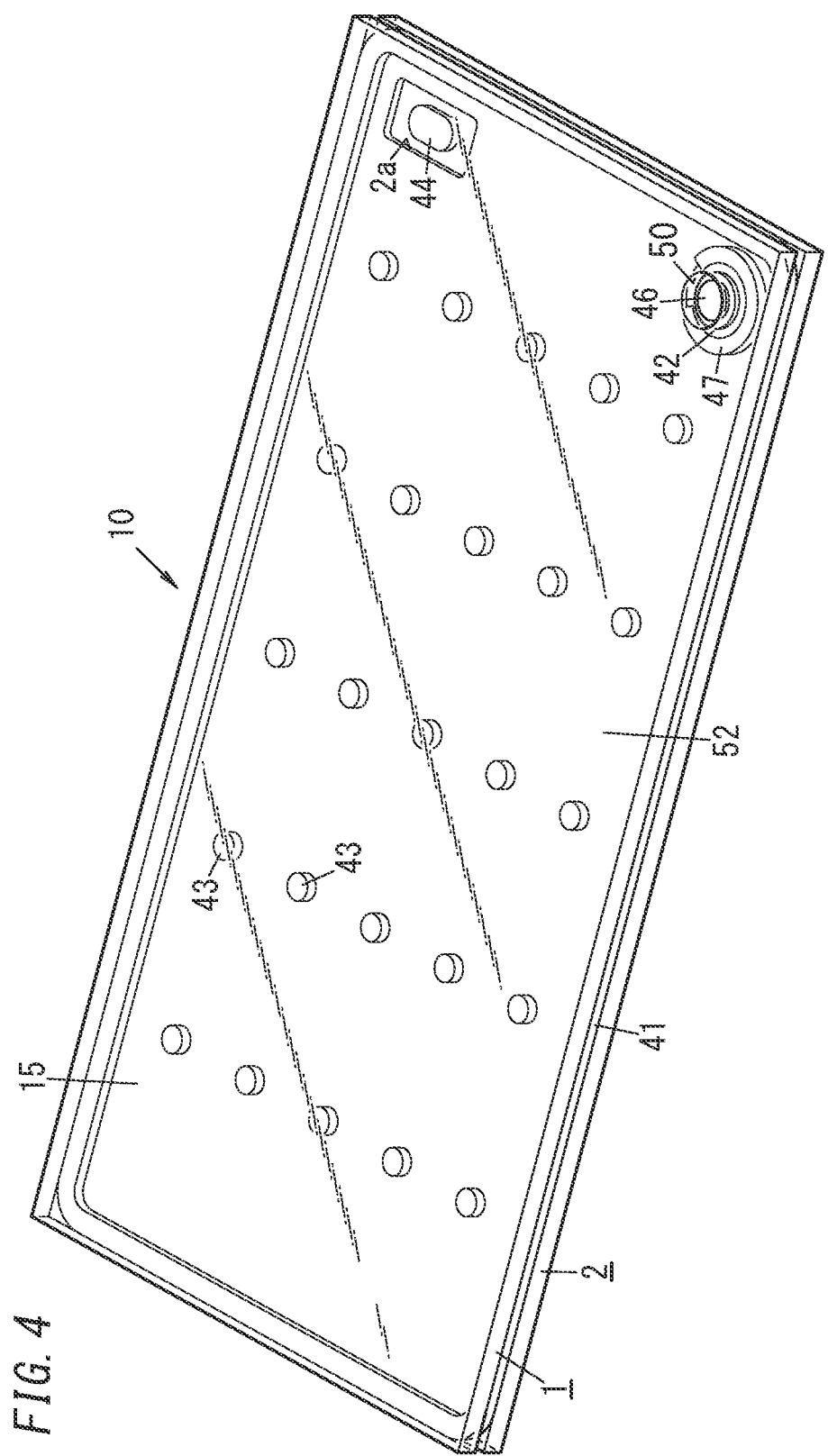
FIG. 4 is a perspective view of a work in progress of a glass panel unit according to the exemplary embodiment.

The preparatory steps are the process steps of providing a work in progress 10 of a glass panel unit shown in FIG. 4. The work in progress 10 has the same structure as the glass panel unit 100 except that the gas adsorbent 44 has not been activated yet. Also, the work in progress 10 is formed out of the glass panel unit assembly 11 shown in FIGS. 5 and 6.

Figure 16:
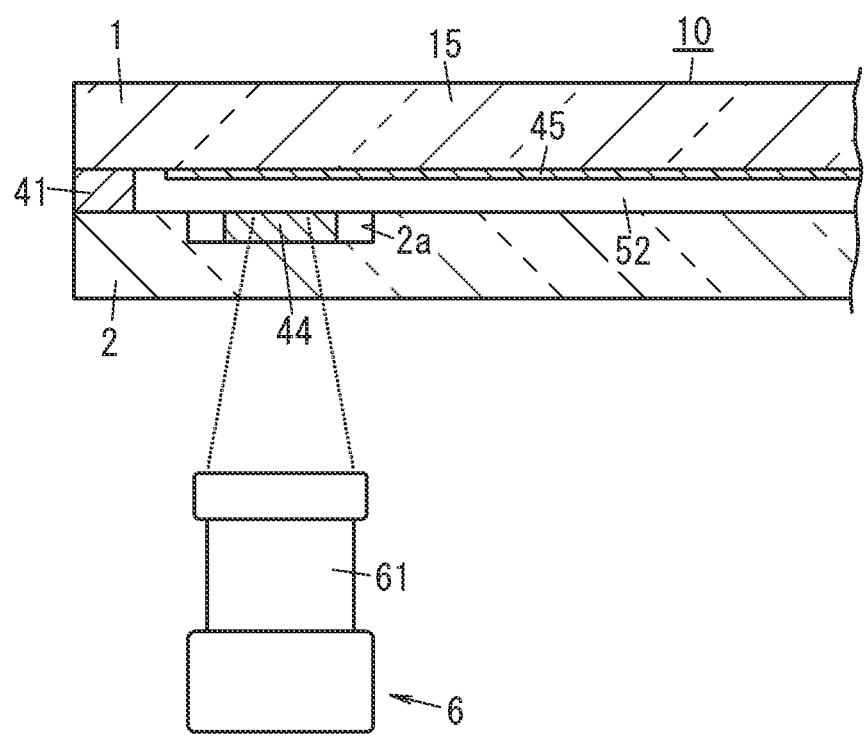
FIG. 16 illustrates yet another process step of the manufacturing method.
Figure 17:
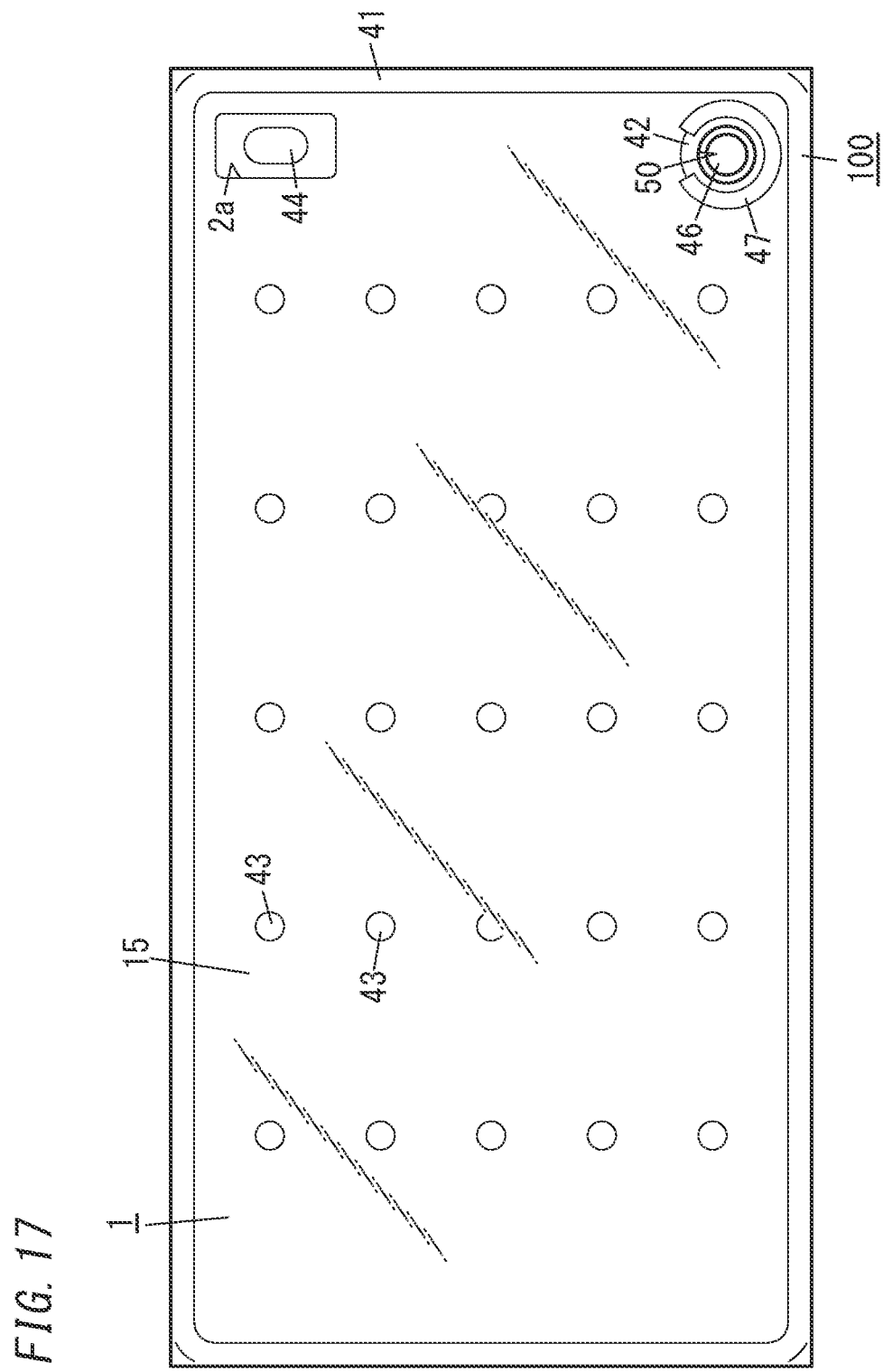
FIG. 17 illustrates yet another process step of the manufacturing method.

The preparatory steps include an assembling step (see FIGS. 7-11), a melting step (see FIG. 12), a gas exhausting step (see FIGS. 12 and 13), a sealing step (see FIGS. 12, 14, and 15), and an activating step (see FIGS. 16 and 17).

The assembling step is the step of providing the assembly 11.

Figure 5:
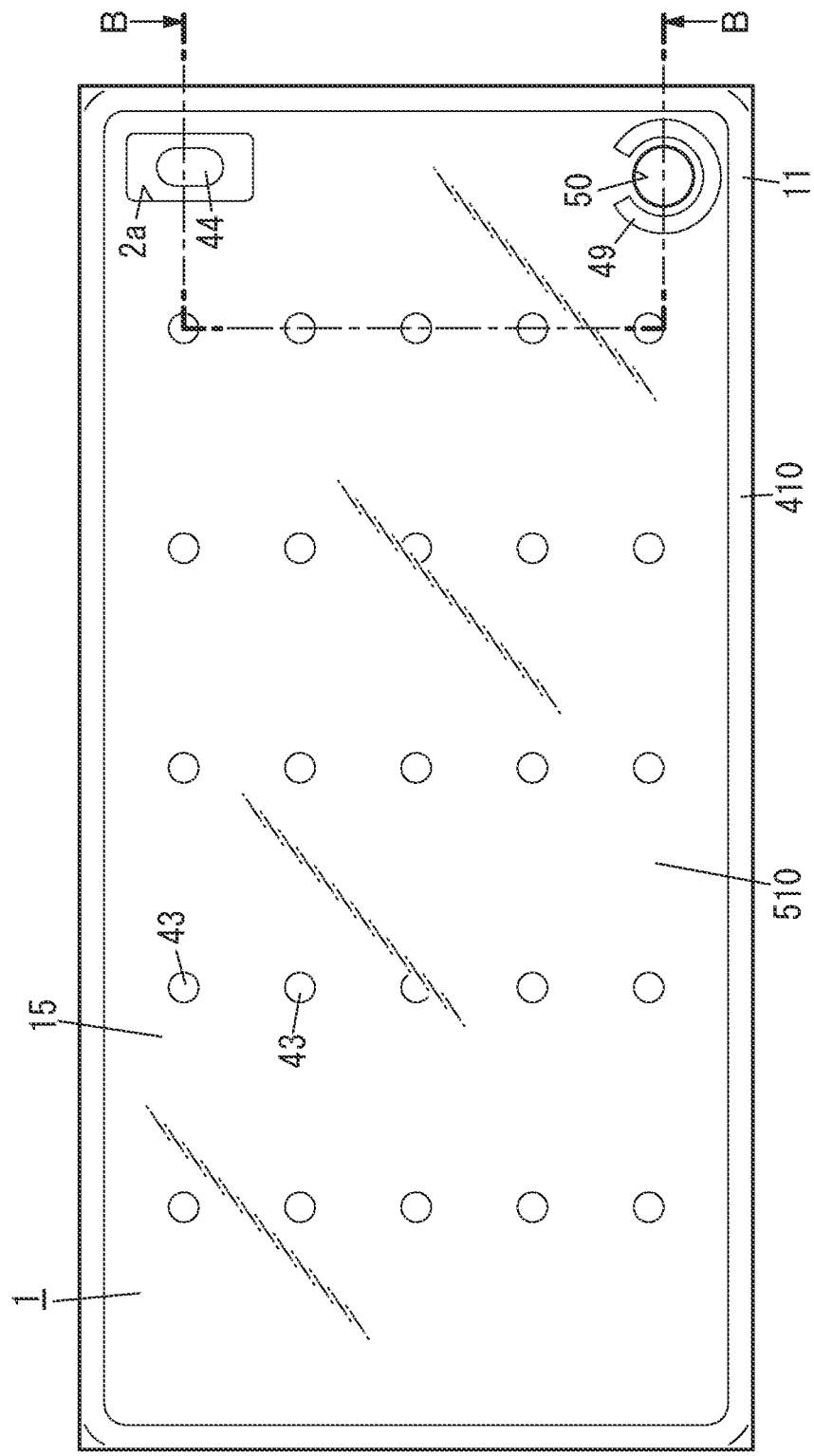
FIG. 5 is a front view of a glass panel unit assembly according to the exemplary embodiment.
Figure 6:
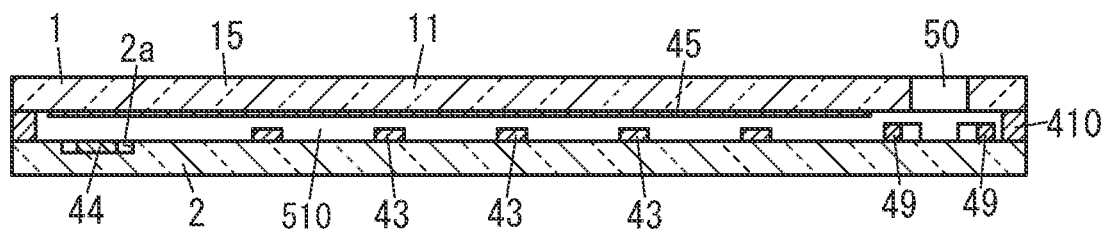
FIG. 6 is a schematic cross-sectional view thereof taken along the plane B-B shown in FIG. 5.

The assembly 11 includes the first and second glass panes 1, 2 and the peripheral wall 410 as shown in FIGS. 5 and 6, The assembly 11 further has an internal space 510 surrounded with the first and second glass panes 1, 2 and the peripheral wall 410. The assembly 11 further includes, in the internal space 510, the gas adsorbent 44, the plurality of pillars (spacers) 43, and a dam material 49. The assembly 11 further has the exhaust port 50, In the assembly 11, no gases have been exhausted from the internal space 510 yet, the peripheral wall 410 and the dam material 49 have not been melted and cured yet, and the exhaust port 50 has not been sealed yet.

The peripheral wall 410 is formed out of a sealant (hot glue). The peripheral wall 410 is arranged between the first glass pane 1 and the second glass pane 2. The peripheral wall 410 has a frame shape as shown in FIG. 6. In particular, the peripheral wall 410 has a rectangular frame shape. The peripheral wall 410 is formed along the outer periphery of the first and second glass panes 1, 2. This allows the internal space 510 surrounded with the peripheral wall 410, the first glass pane 1, and the second glass pane 2 to be created in the assembly 11.

The dam material 49 includes the sealant (hot glue). The dam material 49 is provided on the second glass pane 2 and inside the internal space 510. The dam material 49 has the shape of an incomplete ring (such as a C-ring) arranged along the outer periphery of the exhaust port 50. The dam material 49 is spaced apart from, but arranged rather close to, the peripheral wall 410. That is to say, the dam material 49 is provided at an end of the internal space 510. The dam material 49 includes the same sealant as the peripheral wall 410.

The first glass pane 1 includes the body 15, the infrared reflective film 45, and the exhaust port 50 as shown in FIG.

6. The exhaust port 50 runs through the body 15 and allows the internal space 510 to communicate with an external environment. The infrared reflective film 45 is provided in the internal space 510 to cover the body 15. The infrared reflective film 45 is in contact with the body 15. The body 15 has the same plate shape as the second glass pane 2.

The second glass pane 2 has the bottomed recess 2a as shown in FIG. 6. The recess 2a is formed to be located in the internal space 510. In addition, the recess 2a is provided to be depressed away from the first glass pane 1 with respect to the internal space 510.

The assembling step is the process step of forming the first glass pane 1, the second glass pane 2, the gas adsorbent 44, the peripheral wall 410, the dam material 49, the internal space 510, the exhaust port 50, the recess 2a, and the plurality of pillars 43 to obtain the assembly 11. The assembling step includes first through seventh process steps. Optionally, the order in which the fourth to sixth process steps are performed may be changed as appropriate.

The first process step is the process step of forming the first glass pane 1 and the second glass pane 2 (glass pane forming step). The first process step may include forming the first glass pane 1 and the second glass pane 2 in a plate shape, for example. Optionally, the first process step may include cleaning the first glass pane 1 and the second glass pane 2 as needed.

Figure 7:
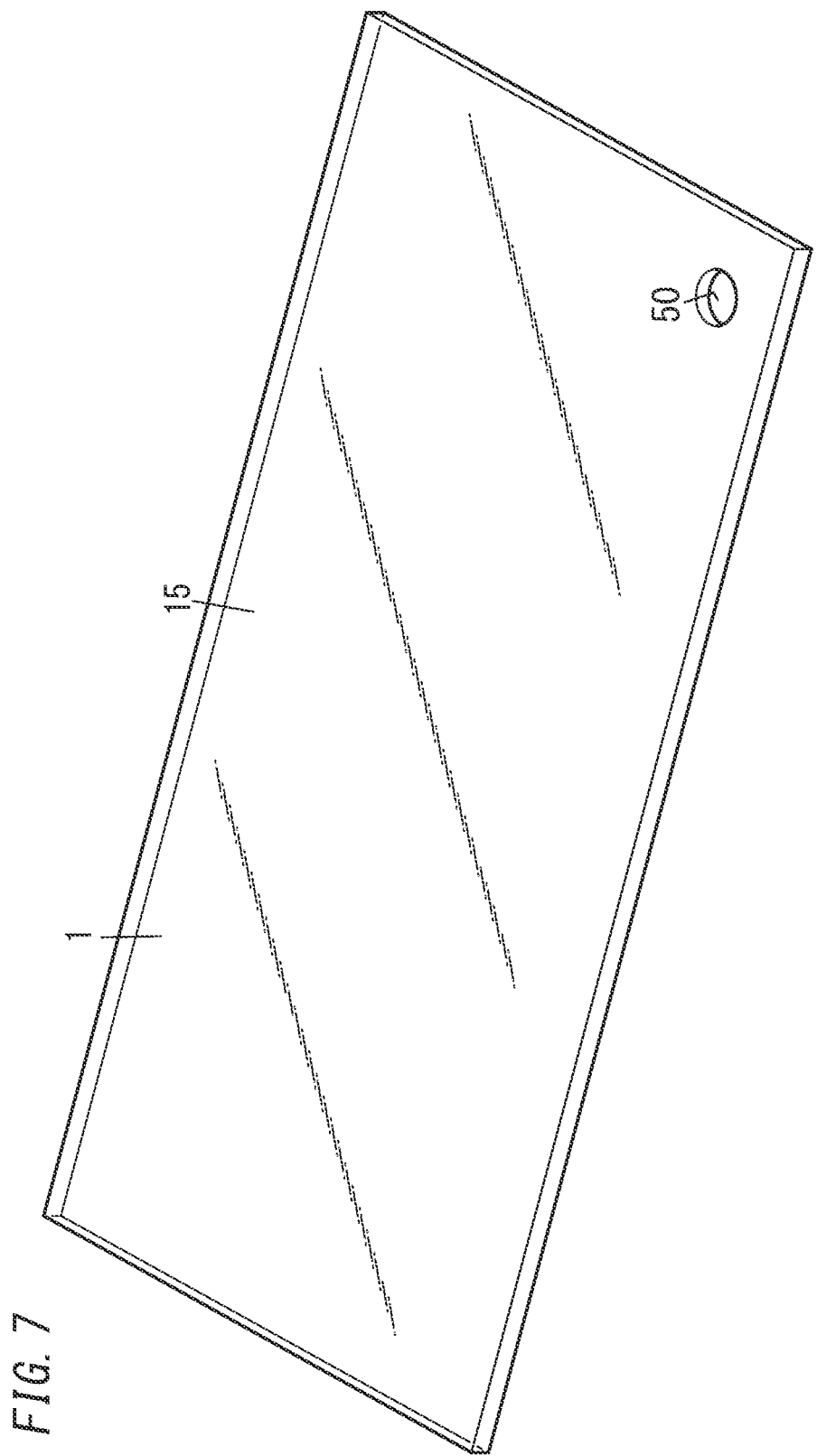
FIG. 7 illustrates a process step of a method for manufacturing a glass panel unit according to the exemplary embodiment.

The second process step is the process step of providing the exhaust port 50. The second process step may include providing the exhaust port 50 through the first glass pane 1 as shown in FIG. 7. Optionally, the second process step may include cleaning the first glass pane 1 as needed.

Figure 8:
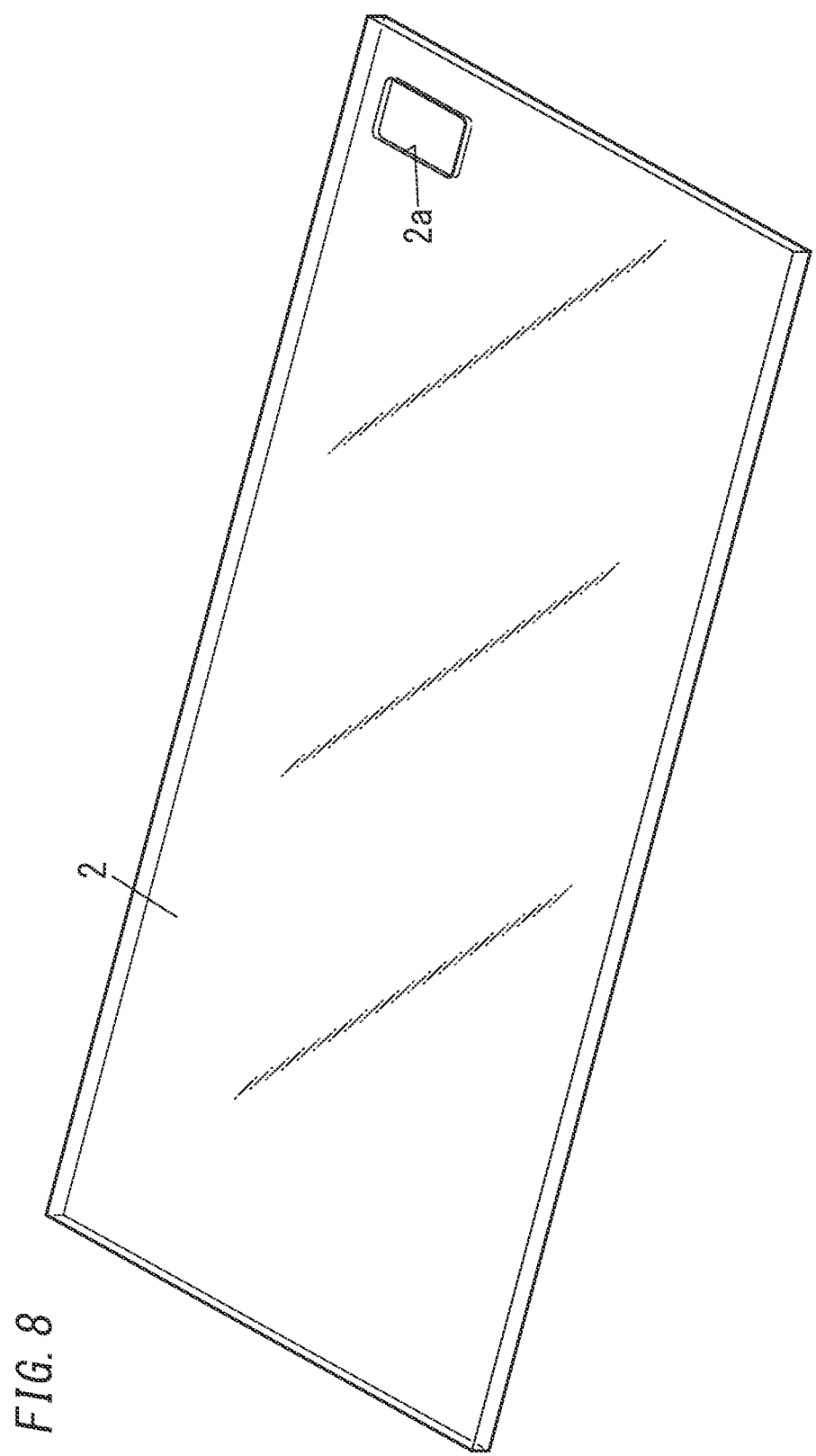
FIG. 8 illustrates another process step of the manufacturing method.

The third process step is the process step of providing the recess 2a. The third process step may include providing the recess 2a on the second glass pane 2 as shown in FIG. 8. Optionally, the third process step may include cleaning the second glass pane 2 as needed.

The fourth process step is the process step of forming the pillars 43 (pillar forming step). The third step includes providing a plurality of pillars 43 in advance and placing the plurality of pillars 43 at predetermined positions on the second glass pane 2 using a chip mounter, for example. Optionally, the plurality of pillars 43 may be formed by photolithography and etching techniques. In that case, the plurality of pillars 43 may be made of a photocurable material, for example. Still alternatively, the plurality of pillars 43 may also be formed by a known thin film forming technique.

The fifth process step is the process step of arranging the peripheral wall 410 and the dam material 49 (sealant arranging step). The fifth process step includes forming a frame-shaped sealant by applying, using a dispenser, for example, a sealant onto the second glass pane 2 along the outer periphery thereof and then drying the frame-shaped sealant to form the peripheral wall 410 (see FIG. 9). In addition, the fifth process step also includes forming an incomplete-ring-shaped sealant by applying, using a dispenser, for example, a sealant onto the second glass pane 2 at a position close to, but spaced from, the peripheral wall 410 and then drying the ring-shaped sealant to form the dam material 49 (see FIG. 9). Optionally, the fifth process step may also include prebaking the frame-shaped sealant and the ring-shaped sealant while drying then. For example, the second glass pane 2 on which the frame-shaped sealant and the ring-shaped sealant have been formed may be heated at 480° C. for 20 minutes, for example. In that case, the first glass pane 1 may be heated along with the second glass pane 2. That is to say, the first glass pane 1 may be heated on the same condition (at 480° C. for 20 minutes) as the second glass pane 2. This reduces the difference in the degree of warpage between the first glass pane 1 and the second glass pane 2.

The sixth process step is the process step of arranging the gas adsorbent 44 (gas adsorbent arranging step). The sixth process step includes arranging the gas adsorbent 44 in the recess 2a using a chip mounter, for example.

Figure 9:
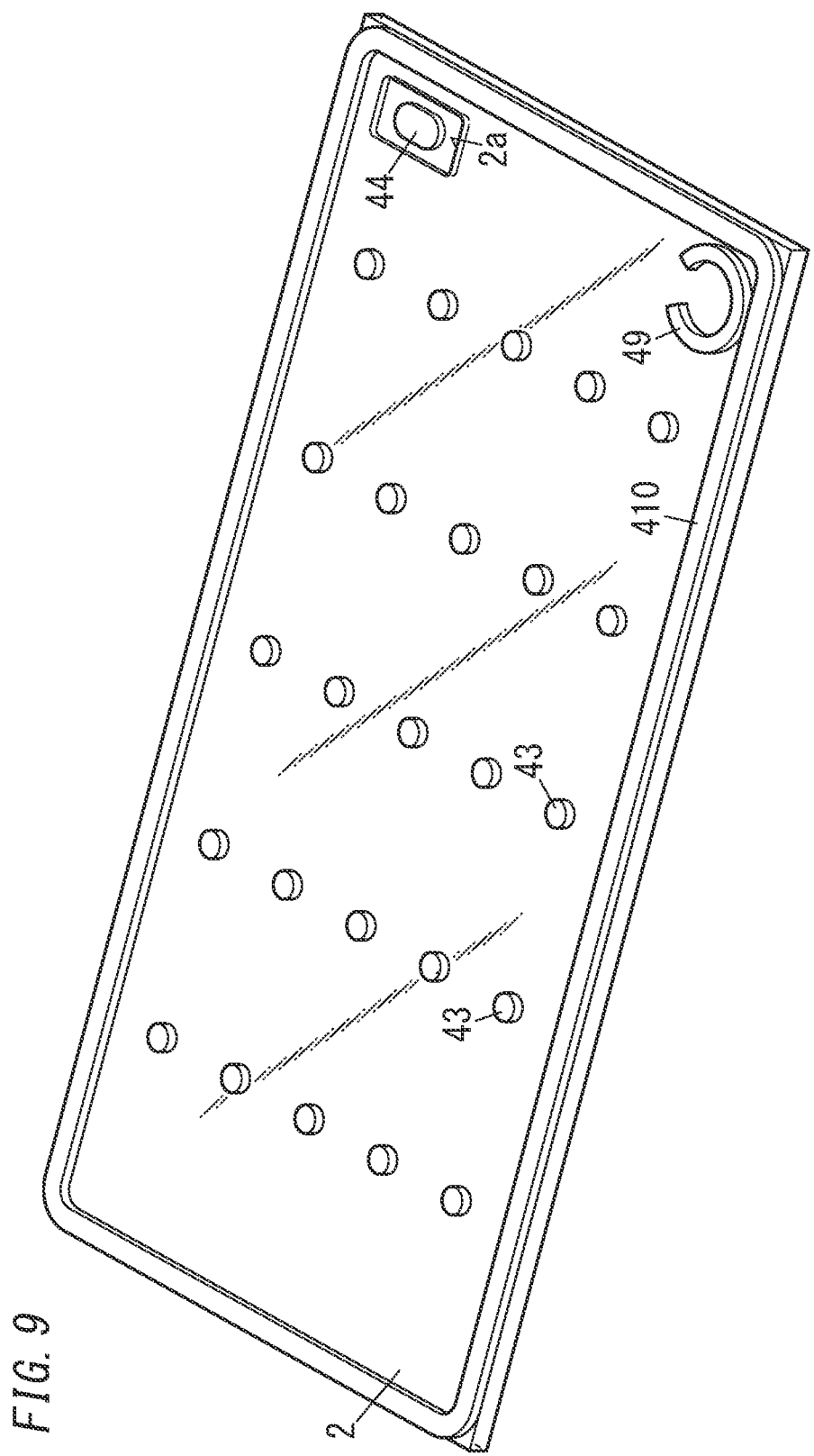
FIG. 9 illustrates still another process step of the manufacturing method.

The second glass pane 2 such as the one shown in FIG. 9 is obtained by finishing the first through sixth process steps. On this second glass pane 2, the peripheral wall 410, the dam material 49, the recess 2a, the gas adsorbent 44, and the plurality of pillars 43 have been formed. According to this embodiment, it is not until the first through sixth process steps have been finished that the seventh process step is performed.

Figure 10:
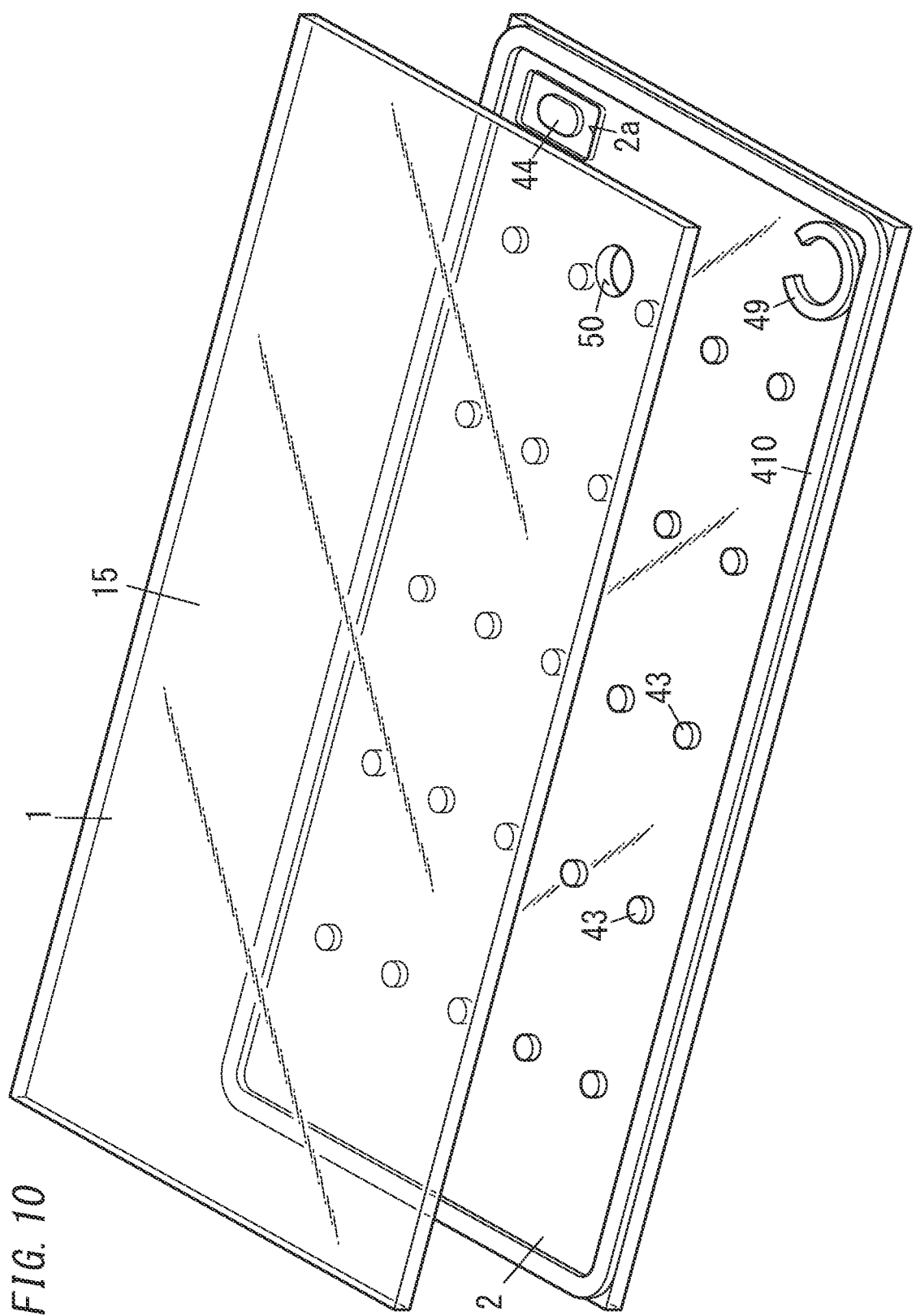
FIG. 10 illustrates yet another process step of the manufacturing method.

The seventh process step is the process step of arranging the first glass pane 1 and the second glass pane 2 (arrangement step). The seventh process step includes arranging the first glass pane 1 and the second glass pane 2 such that the first glass pane 1 and the second glass pane 2 are parallel to each other and face each other as shown in FIG. 10.

Figure 11:
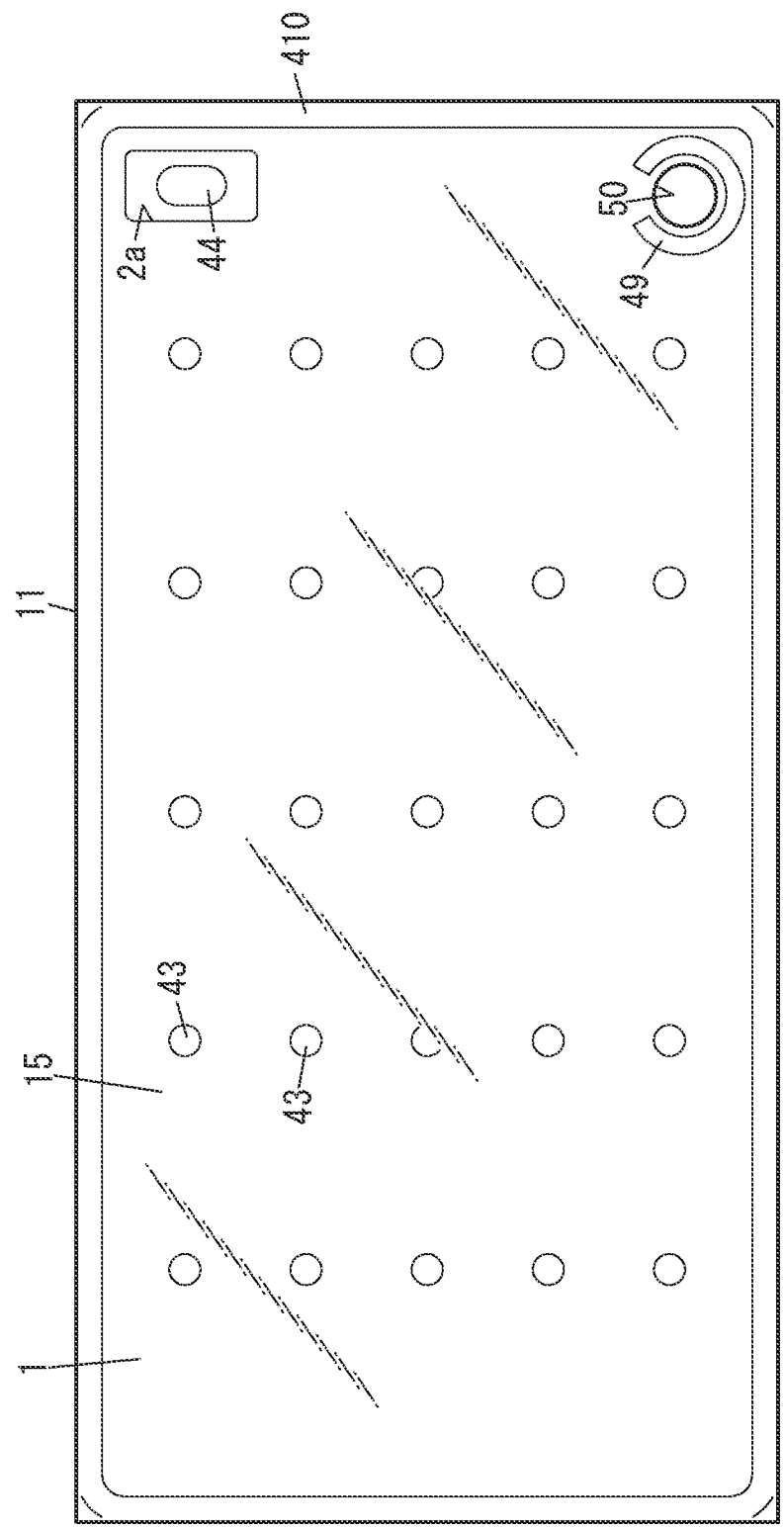
FIG. 11 illustrates yet another process step of the manufacturing method.
Figure 12:
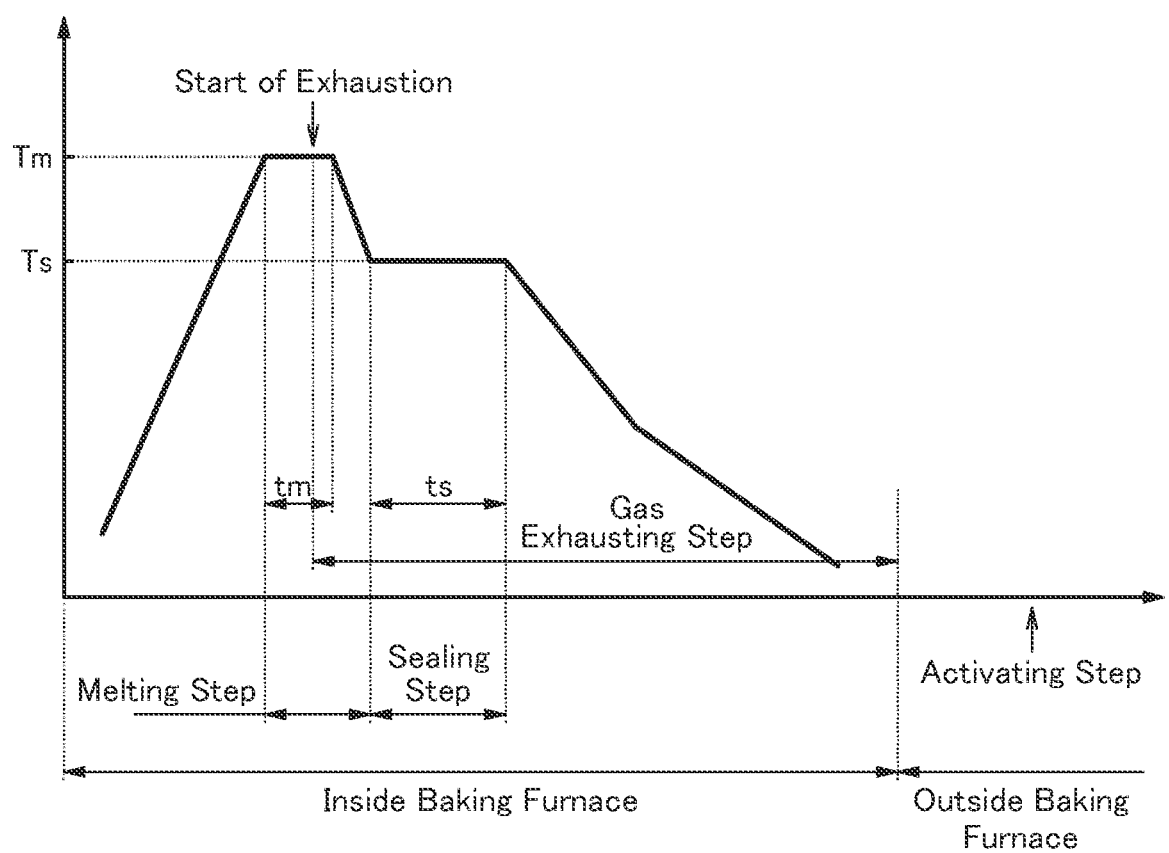
FIG. 12 illustrates yet another process step of the manufacturing method.

The assembly 11 such as the one shown in FIG. 11 is obtained through the assembly step described above. After the assembly step has been performed, a melting step (bonding step), a gas exhausting step, a sealing step, and an activating step are performed as shown in FIG. 12.

The inching step is performed in a baking furnace. The melting step is the process step of inciting the peripheral wall 410 at a first predetermined temperature (melting temperature) Tm to hermetically bond the first glass pane 1 and the second glass pane 2 together with the peripheral wall 410 thus melted. Specifically, the assembly 11 is loaded into the baking furnace. Thereafter, the assembly 11 is heated at the melting temperature Tm for a first predetermined amount of time (melting time) tm (see FIG. 12). Meanwhile, the melting step also includes melting the dam material 49 to allow the first glass pane 1 and the second glass pane 2 to be hermetically bonded together with the dam material 49 thus incited. The melting temperature Tm is set at a temperature equal to or higher than the softening point of the sealant. The melting temperature Tm is suitably equal to or lower than 500° C., more suitably equal to or lower than 350° C., and even more suitably equal to or lower than 300° C. In an example of this embodiment, the gas adsorbent 44 may be heated in the air. In that case, the metallic getter material in the gas adsorbent 44 tends to lose its activity at 350° C. That is why the melting temperature Tm is suitably set at a temperature lower than 350° C. Also, if at least one of the first glass pane 1 or the second glass pane 2 includes reinforced glass, the melting temperature Tm is suitably set at a temperature equal to or lower than 300° C. The sealant may have a softening point of 265° C., for example. Note that the melting time tin may be selected arbitrarily according to the dimensions of the first glass pane 1 and the second glass pane 2 and the dimensions of the peripheral wall 410, for example.

Also, in this embodiment, the temperature in the baking furnace is lowered to perform the sealing step after the melting step. This allows the peripheral wall 410 to be cured and turn into the frame member 41 and also allows the dam material 49 to be cured and turn into the dam member 47.

Figure 13:
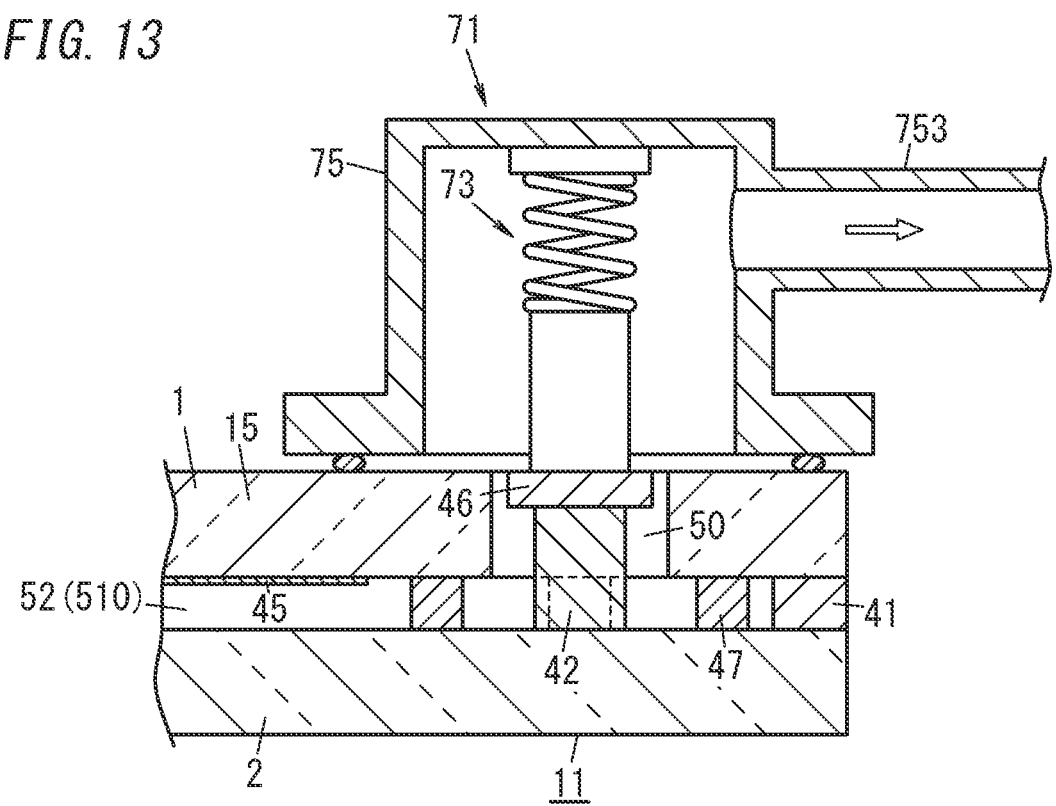
FIG. 13 illustrates yet another process step of the manufacturing method.

The gas exhausting step is the process step of exhausting, in the baking furnace, gases from the internal space 510 through the exhaust port 50 to turn the internal space 510 into a vacuum space 52. The gases may be exhausted using a vacuum pump, for example. The vacuum pump may be connected to the assembly 11 via an evacuation mechanism 71 as shown in FIG. 13, The evacuation mechanism 71 includes an exhaust head 75, a connector 753, and a pressing mechanism 73. The connector 753 connects the exhaust head 75 to the vacuum pump. The exhaust head 75 is pressed against the assembly 11 such that the inside of the exhaust head 75 communicates with the internal space 510 via the exhaust port 50. Specifically, the exhaust head 75 is pressed hermetically onto a portion, surrounding the opening of the exhaust port 50, of the first glass pane 1. Suctioning the air in the exhaust head 75 through the connector 753 (as indicated by the open arrow in FIG. 13) allows the gases to be exhausted from the internal space 510 through the exhaust port 50. The pressing mechanism 73 is provided inside the exhaust head 75. The pressing mechanism 73 is configured to push the port sealing material 42, inserted into the exhaust port 50, toward the second glass pane 2 while having the vacuum space 52 maintained by the evacuation mechanism 71. During the gas exhausting step, the port sealing material 42 and a plate 46, each of which has a diameter smaller than the inside diameter of the exhaust port 50, are inserted into the exhaust port 50 (see FIG. 13). The plate 46 is interposed between the port sealing material 42 and the pressing mechanism 73. In this state, the port sealing material 42 and the plate 46 are pushed elastically by the pressing mechanism 73 toward the second glass pane 2. The port sealing material 42 is a solid sealing material made of a glass frit, for example. In this embodiment, the port sealing material 42 may have a block shape, for example. Alternatively, the port sealing material 42 may also have the shape of a cylinder with a through hole.

In this embodiment, the gas exhausting step is started in the middle of the melting step as shown in FIG. 12. This allows the gases to be exhausted from the internal space 510 through the exhaust port 50 even during the melting step. This makes a difference in pressure between the inside and outside of the assembly 11. This pressure difference causes the first glass pane 1 and the second glass pane 2 to move toward, and approach, each other. This allows, even if the first and second glass panes 1, 2 have some warpage, the first and second glass panes 1, 2 to be hermetically bonded together more easily with the peripheral wall 410. In addition, starting the gas exhausting step in the middle of the melting step allows unnecessary gases, for example, emitted from the peripheral wall 410 and the dam material 49 during the melting step to be exhausted as well. This reduces the chances of those unnecessary gases being left in the vacuum space 52 of the work in progress 10 shown in FIG. 4.

The sealing step is the process step of locally heating, and thereby melting, the port sealing material 42 inserted into the exhaust port 50 to seal the exhaust port 50 with the port sealing material 42 thus melted. The sealing step is performed in the baking furnace. Even during the sealing step, the gas exhausting step is also carried on continuous as shown in FIG. 12. In addition, during the sealing step, the temperature in the baking furnace is maintained at a second predetermined temperature (sealing temperature) Ts equal to or lower than the melting temperature Tm. Specifically, the temperature in the baking furnace is maintained at a sealing temperature Ts lower than the melting temperature Tm. The sealing step includes locally heating, and thereby melting, only the port sealing material 42 at a temperature higher than the sealing temperature is. This reduces the volume of the gases left in the vacuum space 52 after the exhaust port 50 has been sealed. The sealing temperature Ts may be 250° C., for example.

Figure 14:
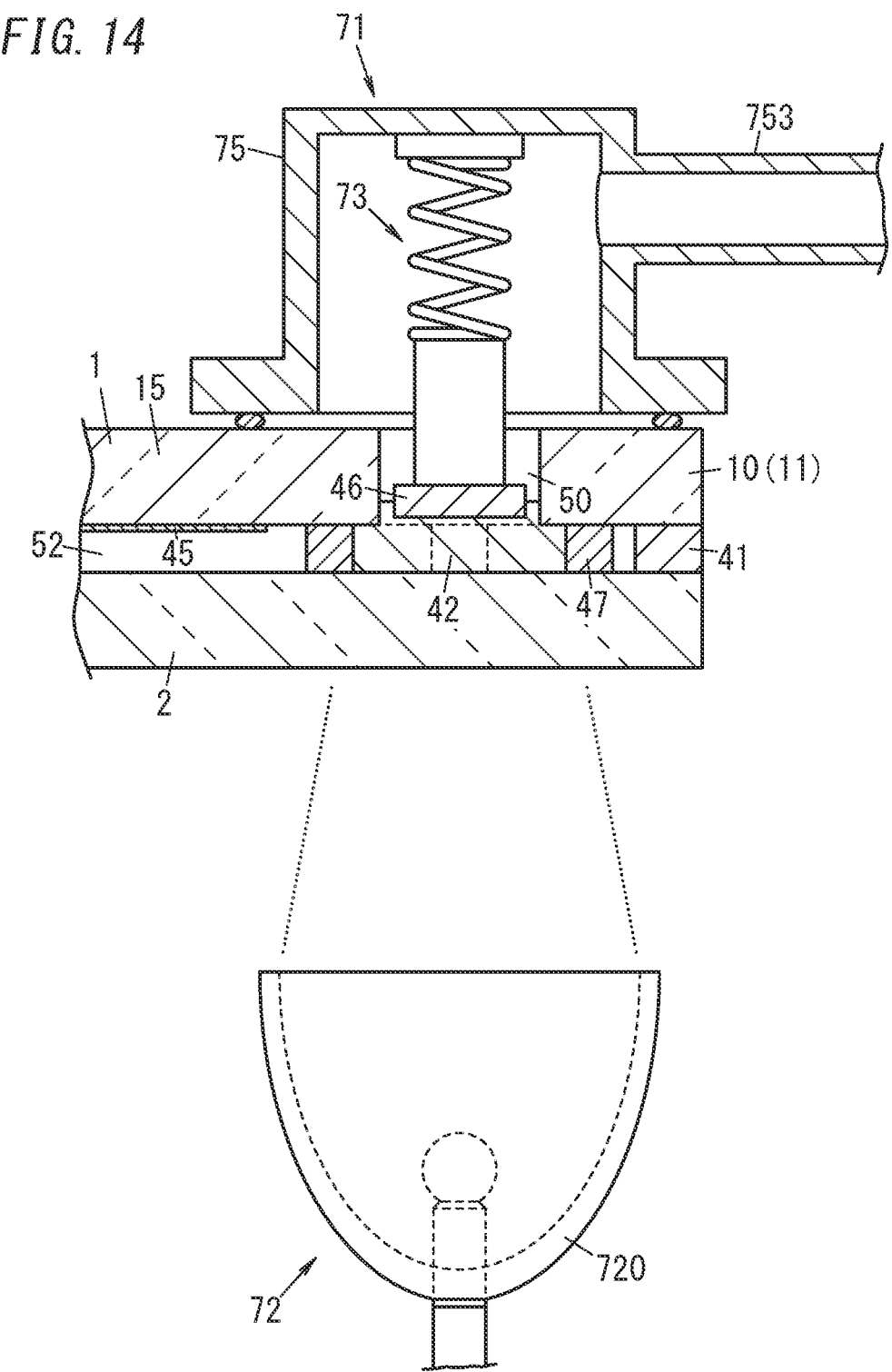
FIG. 14 illustrates yet another process step of the manufacturing method.
Figure 15:
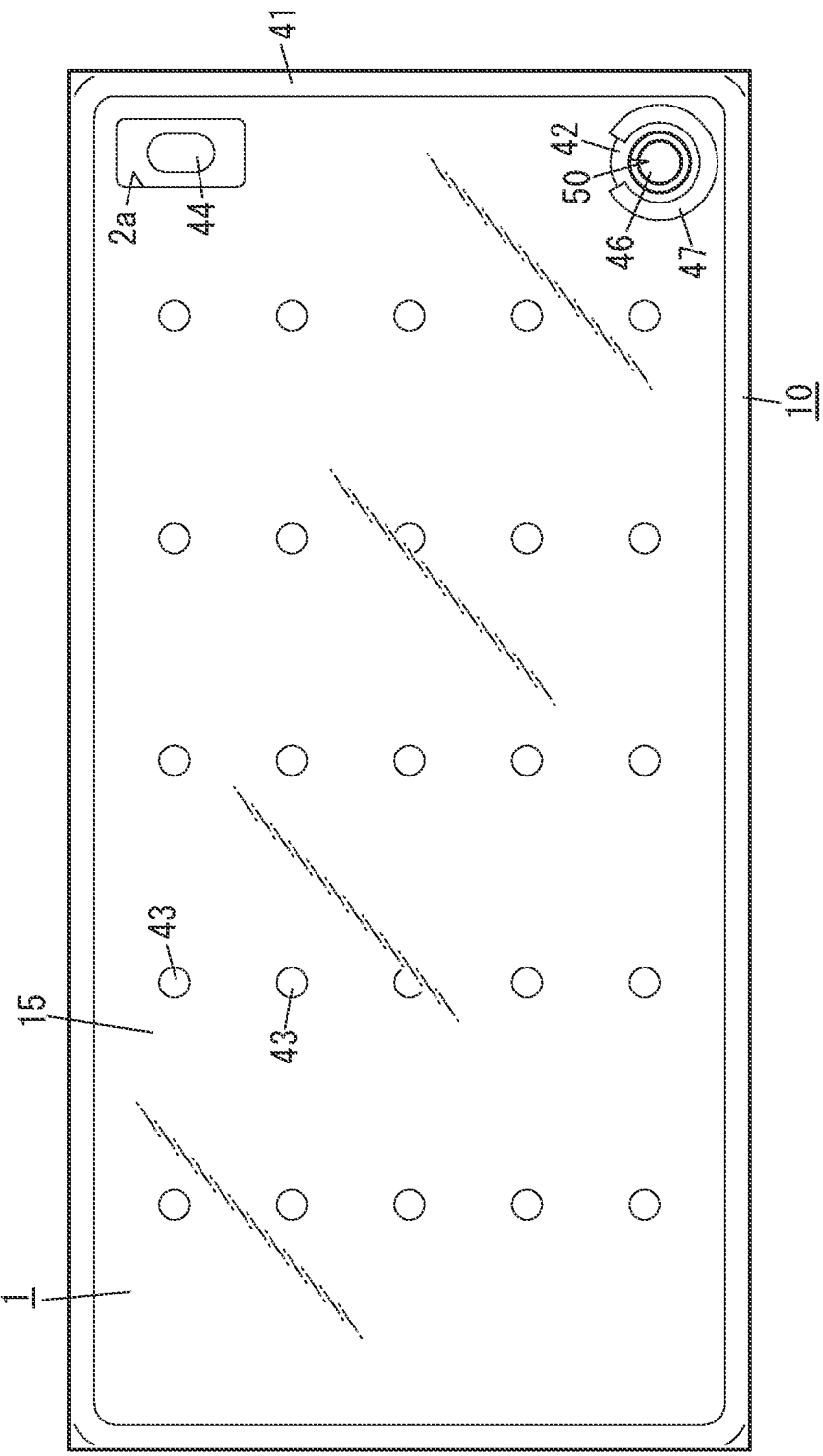
FIG. 15 illustrates yet another process step of the manufacturing method.

In this embodiment, the sealing step is performed using a heating mechanism 72 as shown in FIG. 14. The heating mechanism 72 is arranged opposite from the exhaust head 75 with respect to the assembly 11. The heating mechanism 72 is configured to contactlessly heat the port sealing material 42 inserted into the exhaust port 50. In this case, the port sealing material 42 is locally heated by the heating mechanism 72, and therefore, the temperature of the assembly 11 is maintained at the sealing temperature Ts.

The heating mechanism 72 includes an irradiator 720. The irradiator 720 is configured to heat the port sealing material 42 by irradiating the port sealing material 42 with an infrared ray (near-infrared ray) through the second glass pane 2.

Operating both of the heating mechanism 72 and the pressing mechanism 73 during the sealing step allows the exhaust port 50 to be sealed with the port sealing material 42 with the vacuum space 52 maintained. In that case, the port sealing material 42 may be melted and dammed up in the space inside the dam member 47. Thereafter, the port sealing material 42 thus melted is cured to seal the exhaust port 50.

That is to say, in the sealing step, the port sealing material 42 is not only heated and melted by the heating mechanism 72 but also pressed against the second glass pane 2 by the biasing force applied by the pressing mechanism 73 via the plate 46. The port sealing material 42 is deformed to the point of coming into contact with the inner peripheral surface of the dam member 47 inside the vacuum space 52. The cutout portion of the dam member 47 is sealed up with the port sealing material 42 thus deformed.

Sealing the exhaust port 50 allows the vacuum space 52 to be maintained even after the exhaust head 75 has been removed. Before the exhaust head 75 is removed, the port sealing material 42 that has been melted is cured by heat removal. After the exhaust port 50 has been sealed with the port sealing material 42, the gas exhausting step is stopped. This allows the work in progress 10 shown in FIGS. 4 and 15 to be obtained. After the gas exhausting step and the sealing step have been finished, the work in progress 10 is unloaded from the baking furnace.

In this embodiment, the activating step is performed after the gas exhausting step and the sealing step.

The activating step is performed outside of the baking furnace. The activating step is the process step of activating the gas adsorbent 44 by locally heating the gas adsorbent 44 as shown in FIG. 16. During the activating step, the temperature of the entire work in progress 10 but a region surrounding the gas adsorbent 44 may be around room temperature. The activating step includes locally heating the gas adsorbent 44 to a predetermined activation temperature using the local heating mechanism 6 shown in FIG. 16. The local heating mechanism 6 is arranged outside of the second glass pane and faces the second glass pane 2.

The activation temperature of the gas adsorbent 44 is selected arbitrarily according to the metallic getter material and the material for the second glass pane 2. The activation temperature may be lower than the softening point of the second glass pane 2, for example. This reduces the chances of the second glass pane 2 being broken during the activating step. In addition, the gas adsorbent 44 is locally heated during the activating step, and therefore, the frame member 41 and the dam member 47 are not melted again. The activation temperature is set at a temperature falling within the range from 400° C. to 600° C., for example.

The local heating mechanism 6 includes an irradiator 61 configured to emit a laser beam (see FIG. 16). This allows the gas adsorbent 44 to be irradiated, through the second glass pane 2, with the laser beam emitted from the irradiator 61. Thus, the gas adsorbent 44 is locally heated contactlessly. Locally heating the gas adsorbent 44 improves the work efficiency of the activating step.

According to this embodiment, the glass panel unit 100 shown in FIGS. 1 and 17 is obtained by activating the gas adsorbent 44 in the activating step.

In the manufacturing method according to this embodiment, the difference in thermal conductance between the work in progress 10 and the glass panel unit 100 is suitably equal to or less than 12 W/m$^2$K. This allows, even if residual gases are left in the vacuum space 52 of the work in progress 10, those gases to be adsorbed into the gas adsorbent 44 that has been activated, thus reducing the chances of the residual gases being left in the vacuum space 52 of the glass panel unit 100. This improves the quality of the vacuum space 52 of the glass panel unit 100 and eventually improves the thermal insulation properties of the glass panel unit 100. That is to say, this allows the thermal conductance of the glass panel unit 100 to be lowered to 0.05 W/m$^2$K or less. The difference in thermal conductance is more suitably equal to or less than 10 W/m$^2$K, This allows the glass panel unit 100 to have a thermal conductance of 0.025 W/m$^2$K or less. The difference in thermal conductance is particularly suitably 8 W/m$^2$K or less. This allows the glass panel unit 100 to have a thermal conductance of approximately 0 W/m$^2$K.

Figure 18:
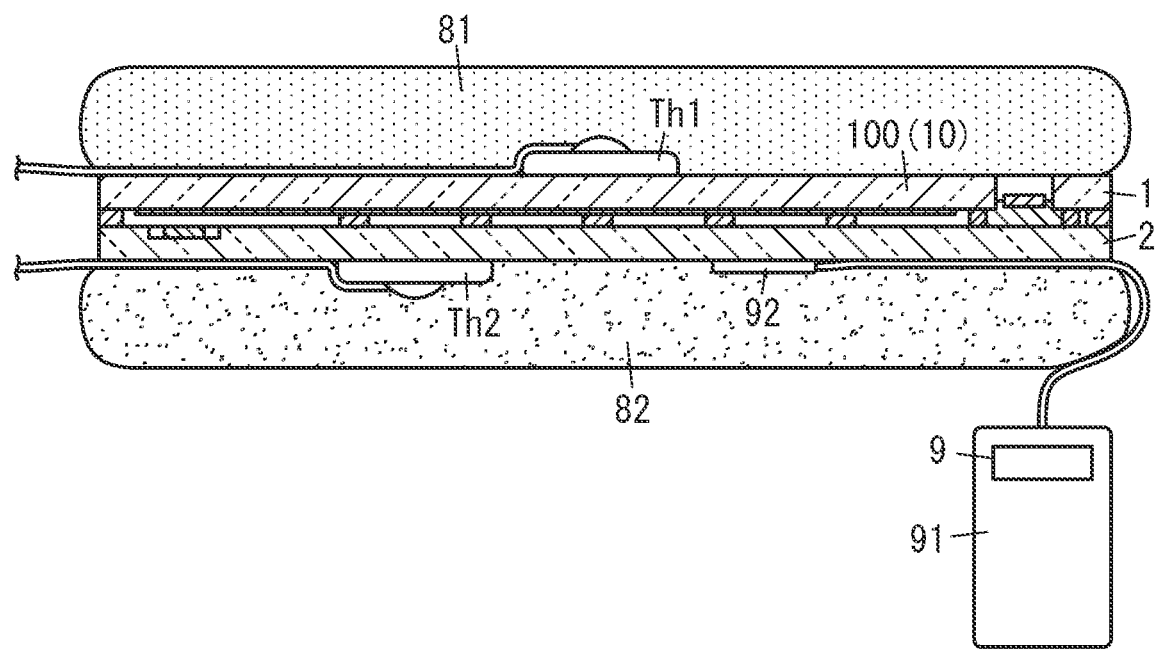
FIG. 18 is a schematic representation illustrating how to measure thermal conductance according to the exemplary embodiment.

The thermal conductance of the glass panel unit 100 is measured with a first thermometer Th1, a second thermometer Th2, a heating unit 81, a cooling unit 82, and a heat flow meter 9 as shown in FIG. 18.

The heat flow meter 9 includes a heat flow meter body 91 and a sensor 92, The sensor 92 is connected to the heat flow meter body 91. The heat flow meter body 91 is configured to indicate a heat flux per unit area detected by the sensor 92.

In the example illustrated in FIG. 18, the glass panel unit 100 is arranged to separate the heating unit 81 from the cooling unit 82, The first thermometer Th1 is arranged on an external surface of the first glass pane. The second thermometer Th2 and the sensor 92 are arranged on the external surface of the second glass pane. In this case, the flux of the heat transferred from the heating unit 81 to the cooling unit 82 via the glass panel unit 100 is detected by the sensor 92, In addition, the surface temperature of the first glass pane 1 is measured by the first thermometer Th1 and the surface temperature of the second glass pane 2 is measured by the second thermometer Th2. The thermal conductance of the glass panel unit 100 is calculated by substituting the heat flux, the surface temperature of the first glass pane 1 and the surface temperature of the second glass pane 2 thus measured into the following Equation (1):

$$Q = C(T1 - T2) \quad (1)$$

where Q indicates the heat flux (W/m$^2$K), T1 indicates the surface temperature (K) of the first glass pane 1, T2 indicates the surface temperature (K) of the second glass pane 2, and C indicates the thermal conductance (W/m$^2$K).

Also, the thermal conductance of the work in progress 10 may be calculated in the same way as the thermal conductance of the glass panel unit 100.

2. Variations

Note that the exemplary embodiment described above is only one of various embodiments of the present disclosure and should not be construed as limiting. Rather, the embodiment described above may be readily modified in various manners depending on a design choice or any other factor without departing from the scope of the present disclosure. Next, variations of the exemplary embodiment will be enumerated one after another.

In the embodiment described above, the glass panel unit 100 has a rectangular shape. However, this is only an example and should not be construed as limiting. Alternatively, the glass panel unit 100 may also have a circular, polygonal, or any other desired shape. That is to say, the first glass pane 1, the second glass pane 2, and the frame member 41 do not have to be rectangular but may also have a circular, polygonal, or any other desired shape. Also, the dam member 47 does not have to have a C-ring shape but may also have the shape of an incomplete polygonal ring shape. In addition, the respective shapes of the peripheral wall 410 and the dam material 49 do not have to be the ones used in the embodiment described above, but may also be any other shapes that allow a glass panel unit 100 of a desired shape to be obtained. Note that the shape and dimensions of the glass panel unit 100 may be determined according to the intended use of the glass panel unit 100.

In the embodiment described above, the height of the dam material 49 is less than that of the peripheral wall 410 and greater than that of the pillars 43. However, this is only an example of the present disclosure and should not be construed as limiting. Alternatively, the dam material 49 may also be as high as the peripheral wall 410.

The first glass pane 1 and the second glass pane 2 do not have to have the same planar dimensions. The first glass pane 1 and the second glass pane 2 do not have to have the same thickness, either. In addition, the first glass pane 1 and the second glass pane 2 do not have to be made of the same material, either.

Furthermore, in the embodiment described above, the first glass pane 1 includes the infrared reflective film 45. However, this is only an example of the present disclosure and should not be construed as limiting. Alternatively, the first glass pane 1 may include a film having desired physical properties instead of the infrared reflective film 45. Still alternatively, the first glass pane 1 may also consist of the body 15 alone. That is to say, the first glass pane 1 may include no infrared reflective film 45.

The peripheral wall 410 (frame member 41) may include not only the sealant but also a core material or any other element as well. Likewise, the dam material 49 (dam member 47) may also include not only the sealant but also a core material or any other element as well.

Furthermore, in the assembly 11, the peripheral wall 410 is just provided between the first and second glass panes 1, 2 and does not bond the first and second glass panes 1, 2 together. However, this is only an example of the present disclosure and should not be construed as limiting. Alternatively, the peripheral wall 410 may bond the first and second glass panes 1, 2 together in as early a stage as the assembly 11. In short, in the assembly 11, the peripheral wall 410 just needs to be located between the first and second glass panes 1, 2 and does not have to bond the first and second glass panes 1, 2 together.

In the embodiment described above, the exhaust port 50 is provided through the first glass pane 1. However, this is only an example and should not be construed as limiting. Alternatively, the exhaust port 50 may be provided through the second glass pane 2. In that case, the gas adsorbent 44 will be provided on the first glass pane 1. A sealing step according to this variation includes locally heating the port sealing material 42 through the first glass pane 1. The exhaust port 50 is provided through either the first glass pane 1 or the second glass pane 2.

Figure 19:
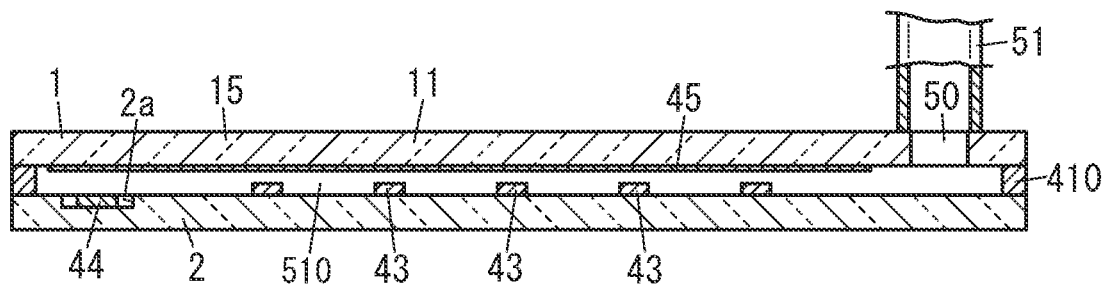
FIG. 19 illustrates a variation of the manufacturing method.
Figure 20:
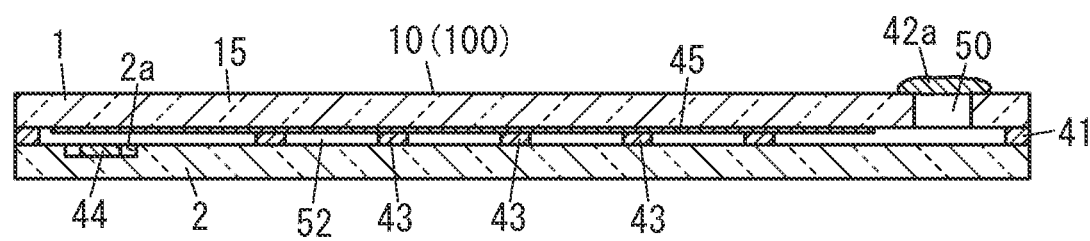
FIG. 20 illustrates another variation of the manufacturing method.

In the sealing step according to the embodiment described above, the exhaust port 50 is sealed by melting the port sealing material 42. However, this is only an example of the present disclosure and should not be construed as limiting. Alternatively, the exhaust port 50 may also be sealed with a sealing cap 42*a* as shown in FIG. 20. The sealing cap 42*a* may be formed by locally heating, and thereby melting and cutting off, a portion, surrounding the exhaust port 50, of the exhaust pipe 51 shown in FIG. 19. The exhaust pipe 51 is connected to the exhaust port 50 in the second process step. The internal surface of the exhaust pipe 51 is connected to the exhaust port 50. This allows the exhaust pipe 51 to communicate with the internal space 510 via the exhaust port 50. In addition, the exhaust pipe 51 is also connected to a vacuum pump in the gas exhausting step. This allows the gases to be exhausted from the internal space 510 via the exhaust pipe 51 and the exhaust port 50. Also, in the example illustrated in FIG. 19, the exhaust pipe 51 is provided for the first glass pane 1. However, this is only an example of the present disclosure and should not be construed as limiting. In a variation of the exemplary embodiment described above, the exhaust pipe 51 may be provided for the second glass pane 2 or the peripheral wall 410. That is to say, the exhaust pipe 51 is suitably provided for the first glass pane 1, the second glass pane 2, or the peripheral wall 410. In that case, the exhaust port 50 is located between the exhaust pipe 51 and the internal space 510. Also, the sealing cap 42*a* is suitably provided for one of the first glass pane 1, the second glass pane 2, or the frame member 41. In that case, the exhaust port 50 is located between the vacuum space 52 and the sealing cap 42*a*. Note that the exhaust pipe 51 may be formed in the shape of a cylinder and may be made of the same glass frit as the port sealing material 42, for example, in that case, the exhaust pipe 51 is locally heated in the sealing step by the heating mechanism 72 at the same temperature as in the embodiment described above.

In the activating step according to the exemplary embodiment described above, the gas adsorbent 44 is locally heated through the second glass pane 2. However, this is only an example of the present disclosure and should not be construed as limiting. Alternatively, the gas adsorbent 44 may also be locally heated through the first glass pane 1.

Furthermore, in the embodiment described above, the gas adsorbent 44 is arranged in the recess 2*a*. However, this is only an example of the present disclosure and should not be construed as limiting. Alternatively, the gas adsorbent 44 may be arranged on the same plane as the pillars 43. That is to say, the second glass pane 2 may have no recesses 2*a*.

Furthermore, in the embodiment described above, the gas adsorbent 44 has the shape of a tablet. However, this is only an example of the present disclosure and should not be construed as limiting. Alternatively, the gas adsorbent 44 may also have any other shape. In addition, the gas adsorbent 44 does not have to be located at an end of the vacuum space 52.

In the embodiment described above, the glass panel unit 100 has the vacuum space 52. However, the vacuum space 52 may be replaced with a pressure reduced space. As used herein, the "pressure reduced space" refers to the internal space 510 with a reduced pressure. The pressure reduced condition may be a condition in which the pressure is lower than the atmospheric pressure.

(3) Aspects

As can be seen from the foregoing description of embodiments and their variations, the present disclosure has the following aspects. In the following description, reference signs are inserted in parentheses just for the sake of clarifying correspondence in constituent elements between the following aspects of the present disclosure and the exemplary embodiments described above.

H A first aspect is a method for manufacturing a glass panel unit. The method includes an assembling step, a bonding step, a gas exhausting step, a sealing step, and an activating step. The assembling step includes providing an assembly (11). The assembly (11) includes a first glass pane (1), a second glass pane (2), a peripheral wall (410), an internal space (510), a gas adsorbent (44), and an exhaust port (50). The second glass pane (2) is arranged to face the first glass pane (1). The peripheral wall (410) is provided between the first glass pane (1) and the second glass pane (2). The peripheral wall (410) has a frame shape. The internal space (510) is surrounded with the first glass pane (1), the second glass pane (2), and the peripheral wall (410). The gas adsorbent (44) is disposed in the internal space (510). The exhaust port (50) allows the internal space (510) to communicate with an external environment. The bonding step includes melting the peripheral wall (410) in a baking furnace at a first predetermined temperature (Tm) to hermetically bond the first glass pane (1) and the second glass pane (2) together with the peripheral wall (410) thus melted. The gas exhausting step includes exhausting a gas from the internal space (510) through the exhaust port (50) in the baking furnace to turn the internal space (510) into a vacuum space (52). The sealing step includes maintaining a temperature in the baking furnace at a second predetermined temperature (Ts) equal to or lower than the first predetermined temperature (Tm). The sealing step further includes locally heating to a temperature higher than the second predetermined temperature (Ts), and thereby melting, either a port sealing material (42) inserted into the exhaust port (50) or an exhaust pipe (51) connected to the exhaust port (50) to seal the exhaust port (50) and thereby obtain a work in progress (10). The activating step includes activating the gas adsorbent (44) after the sealing step to obtain a glass panel unit (100).

The first aspect reduces the chances of a residual gas being left in the vacuum space (52).

A second aspect is an implementation of the method for manufacturing a glass panel unit according to the first aspect. In the second aspect, the sealing step includes locally heating the port sealing material (42) through one glass pane having no exhaust port (50) and selected from the group consisting of the first glass pane (1) and the second glass pane (2).

The second aspect reduces the chances of a residual gas being left in the vacuum space (52).

A third aspect is an implementation of the method for manufacturing a glass panel unit according to the first or second aspect. In the third aspect, the method includes sealing the exhaust port (50) while exhausting the gas from the internal space (510).

The third aspect reduces the chances of a residual gas being left in the vacuum space (52).

A fourth aspect is an implementation of the method for manufacturing a glass panel unit according to any one of the first to third aspects. In the fourth aspect, the gas adsorbent (44) contains a metallic getter material.

The fourth aspect reduces the chances of a residual gas being left in the vacuum space (52).

A fifth aspect is an implementation of the method for manufacturing a glass panel unit according to any one of the first to fourth aspects. In the fifth aspect, the gas adsorbent (44) contains titanium, vanadium, and iron.

The fifth aspect reduces the chances of a residual gas being left in the vacuum space (52).

A sixth aspect is an implementation of the method for manufacturing a glass panel unit according to any one of the first to fifth aspects. In the sixth aspect, the peripheral wall (410) contains a glass frit, and the first predetermined temperature (Tm) is set at a temperature equal to or higher than a softening point of the glass frit.

The sixth aspect reduces the chances of a residual gas being left in the vacuum space (52).

A seventh aspect is an implementation of the method for manufacturing a glass panel unit according to any one of the first to sixth aspects. In the seventh aspect, a difference in thermal conductance between the work in progress (10) and the glass panel unit (100) is equal to or less than 12 W/m²K or less.

The seventh aspect reduces the chances of a residual gas being left in the vacuum space (52).

REFERENCE SIGNS LIST

100 Glass Panel Unit
10 Work in Progress
11 Assembly
1 First Glass Pane
2 Second Glass Pane
410 Peripheral Wall
42 Port Sealing Material
44 Gas Adsorbent
50 Exhaust Port
51 Exhaust Pipe
510 Internal Space
52 Vacuum Space
Tm First Predetermined Temperature (Melting Temperature)
Ts Second Predetermined Temperature (Sealing Temperature)

The invention claimed is:

1. A method for manufacturing a glass panel unit, the method comprising an assembling step, a bonding step, a gas exhausting step, a sealing step, and an activating step,
the assembling step including providing an assembly,
the assembly including:
a first glass pane;
a second glass pane arranged to face the first glass pane;
a peripheral wall formed in a frame shape and provided between the first glass pane and the second glass pane;
an internal space surrounded with the first glass pane, the second glass pane, and the peripheral wall;
a gas adsorbent disposed in the internal space; and
an exhaust port allowing the internal space to communicate with an external environment,
the bonding step including melting the peripheral wall in a baking furnace at a first predetermined temperature to hermetically bond the first glass pane and the second glass pane together with the peripheral wall thus melted,
the gas exhausting step including exhausting a gas from the internal space through the exhaust port in the baking furnace to turn the internal space into a vacuum space,
the sealing step including maintaining a temperature in the baking furnace at a second predetermined temperature equal to or lower than the first predetermined temperature and locally heating to a temperature higher than the second predetermined temperature, and thereby melting, a port sealing material inserted into the exhaust port to seal the exhaust port and thereby obtain a work in progress,
the activating step including activating the gas adsorbent after the sealing step to obtain a glass panel unit, and
the sealing step including locally heating the port sealing material through one glass pane having no exhaust port and selected from the group consisting of the first glass pane and the second glass pane.

2. The method of claim 1, comprising sealing the exhaust port while exhausting the gas from the internal space.

3. The method of claim 1, wherein
the gas adsorbent contains a metallic getter material.

4. The method of claim 1, wherein
the gas adsorbent contains titanium, vanadium, and iron.

5. The method of claim 1, wherein
the peripheral wall contains a glass frit, and
the first predetermined temperature is set at a temperature equal to or higher than a softening point of the glass frit.

6. The method of claim 1, wherein
a difference in thermal conductance between the work in progress and the glass panel unit is equal to or less than 12 W/m₂ K.

7. The method of claim 2, wherein
the gas adsorbent contains titanium, vanadium, and iron.

8. The method of claim 2, wherein
the peripheral wall contains a glass frit, and
the first predetermined temperature is set at a temperature equal to or higher than a softening point of the glass frit.

9. The method of claim 2, wherein
a difference in thermal conductance between the work in progress and the glass panel unit is equal to or less than 12 W/m² K.

* * * * *